United States Patent [19]

Fujisawa et al.

[11] Patent Number: 5,467,277
[45] Date of Patent: Nov. 14, 1995

[54] APPARATUS AND METHOD FOR AUTOMOBILE CONTROL USING A CONTROL CHARACTERISTIC WHICH CAN BE ADJUSTED BY THE DRIVER

[75] Inventors: Masaaki Fujisawa, Mito; Taiji Hasegawa, Nakaminato; Toshio Ishii, Mito; Shoji Sasaki; Masahide Sakamoto, both of Katsuta, all of Japan

[73] Assignee: Hitachi, Ltd., Tokyo, Japan

[21] Appl. No.: 936,224

[22] Filed: Aug. 27, 1992

Related U.S. Application Data

[63] Continuation of Ser. No. 597,339, Oct. 15, 1990, abandoned.

[30] Foreign Application Priority Data

Oct. 20, 1989 [JP] Japan .................................. 1-271665

[51] Int. Cl.[6] .................................................. G06F 17/00
[52] U.S. Cl. .............................. 364/424.05; 364/431.04
[58] Field of Search ........................ 364/431.04, 431.05, 364/424, 05; 395/800

[56] References Cited

U.S. PATENT DOCUMENTS

| | | | |
|---|---|---|---|
| 4,204,255 | 5/1980 | Cremer | 364/424.05 |
| 4,477,874 | 10/1984 | Ikuta et al. | 364/424.05 |
| 4,611,285 | 9/1986 | Weisman, II | 364/424.1 |
| 4,671,235 | 6/1987 | Hosaka | 123/399 X |
| 4,702,335 | 10/1987 | Cage et al. | 364/424.05 |
| 4,812,838 | 3/1989 | Toshira et al. | 364/424.05 |
| 4,853,687 | 8/1989 | Isomnia et al. | 364/424.05 |
| 4,866,622 | 9/1989 | Dreher et al. | 364/431.04 |
| 4,899,280 | 2/1990 | Onari et al. | 364/431.05 |
| 4,908,792 | 3/1990 | Przybyla et al. | 364/431.04 |
| 4,941,096 | 7/1990 | Ito et al. | 364/424.05 |
| 4,996,965 | 3/1991 | Onari et al. | 123/492 |
| 5,031,100 | 7/1991 | Takahashi | 364/424.1 |
| 5,056,026 | 10/1991 | Mitchell et al. | 364/431.04 X |

FOREIGN PATENT DOCUMENTS

| | | |
|---|---|---|
| 3-38439 | 8/1991 | Japan . |
| 2842020C2 | 3/1986 | Switzerland . |
| 3544608A1 | 6/1987 | Switzerland . |

*Primary Examiner*—Vincent N. Trans
*Attorney, Agent, or Firm*—Antonelli, Terry, Stout & Kraus

[57] ABSTRACT

The present specification discloses a control system for an automobile. An automobile control system according to the present invention is provided in an automobile and includes control devices for controlling the automobile in accordance with data on a control characteristic, and a rewritable storage device for storing a plurality of pieces of data on the control characteristics of the control devices and different drivers in corresponding relationship. In response to an input from any particular driver, data on control characteristic corresponding to the particular driver is read from the storage when the particular driver who has input data is the one stored in the storage, and the data is delivered to the control devices. The data on the control characteristic in the storage which the particular driver specifics can be corrected arbitrarily in accordance with a correcting input.

2 Claims, 21 Drawing Sheets

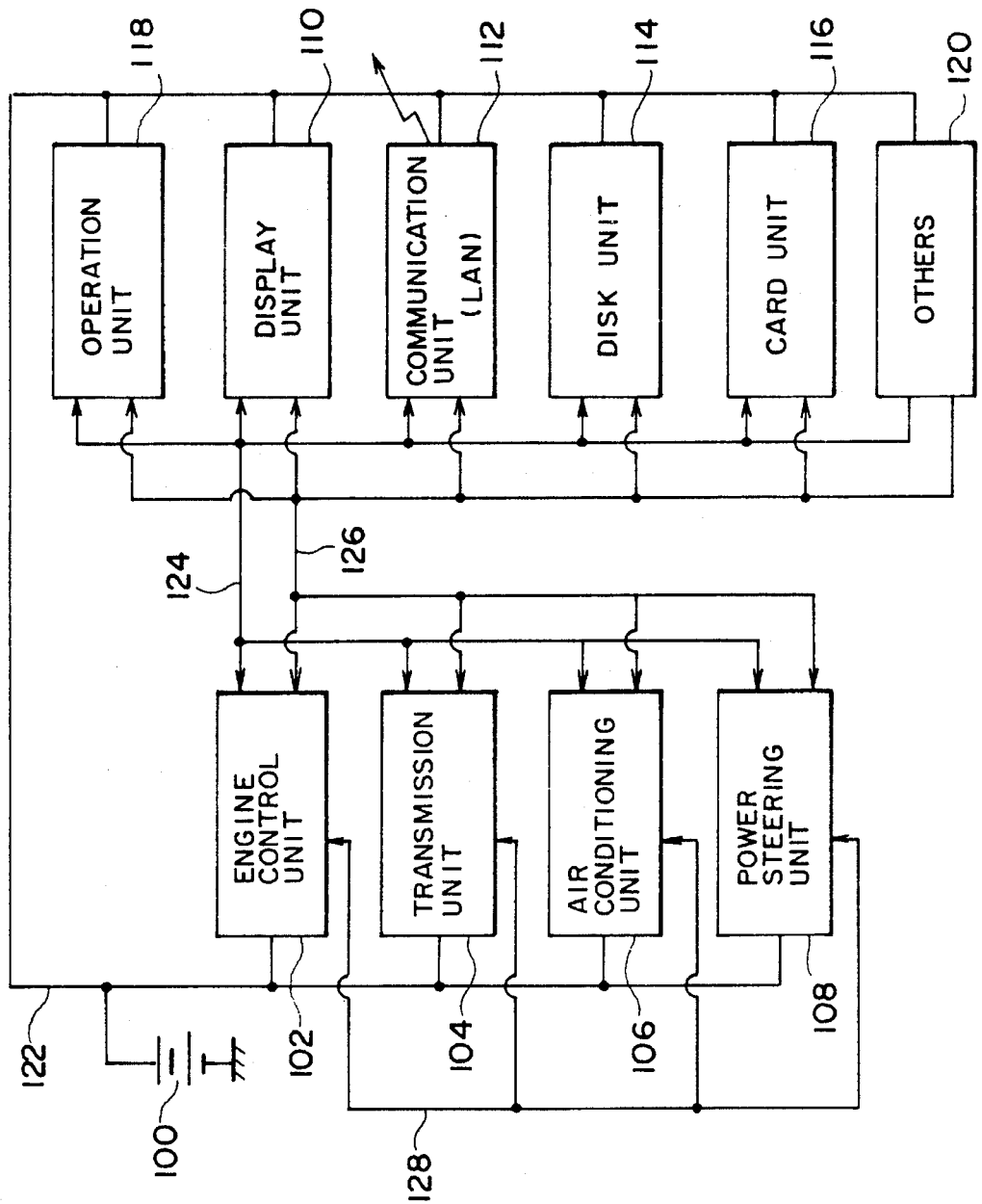

FIG. 4A OPERATION UNIT
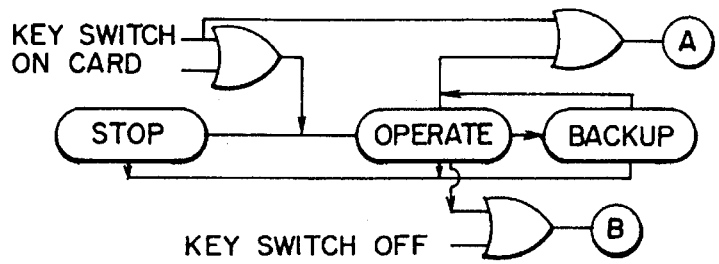
FIG. 4B ENGINE CONTROL UNIT
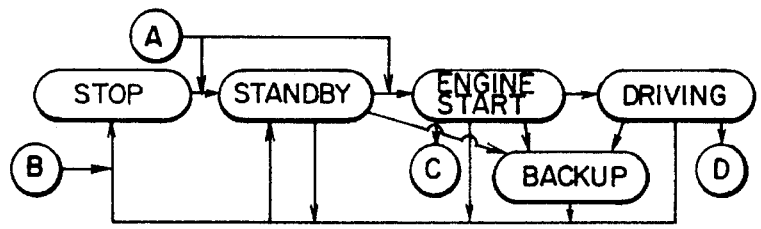
FIG. 4C TRANSMISSION UNIT POWER STEERING UNIT
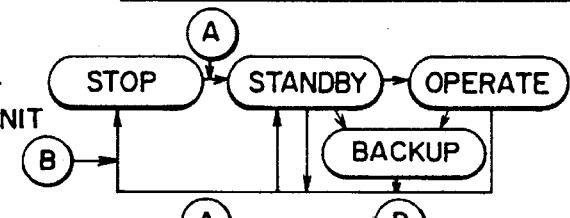
FIG. 4D AUTOMATIC AIR CONDITIONING UNIT
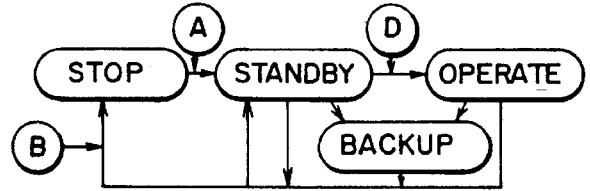
FIG. 4E DISPLAY UNIT
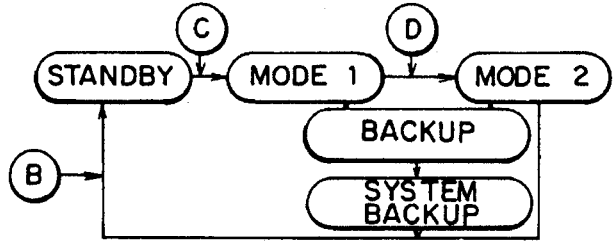
FIG. 4F COMMUNICATION UNIT
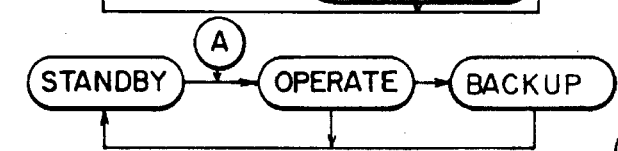
FIG. 4G
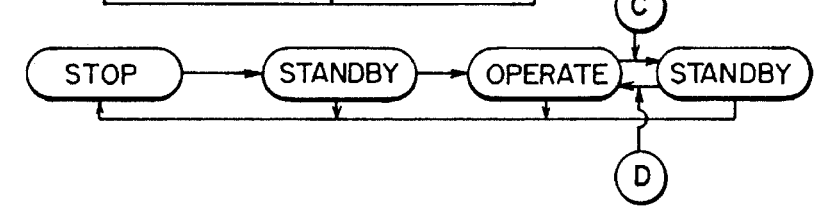

FIG. 6

1. ENGINE CONTROL UNIT TYPE oo NORMAL
   CHARACTERISTIC (     ) 1. STANDARD  2. INDIVIDUALITY

2. TRANSMISSION UNIT TYPE oo NORMAL
   CHARACTERISTIC (     ) 1. STANDARD  2. INDIVIDUALITY

3. AIR CONDITIONING UNIT TYPE oo NORMAL
   USE           (    ) 1. YES   2. NO

4. POWER STEERING UNIT TYPE oo NORMAL
   CHARACTERISTIC (    ) 1. STANDARD  2. INDIVIDUALITY

5. DISK UNIT TYPE oo NORMAL
   USE           (    ) 1. YES   2. NO
   ⋮

10. REGISTRATION OF SYSTEM SPECIFICATION
    REGISTER    (    ) 1. YES   2. NO

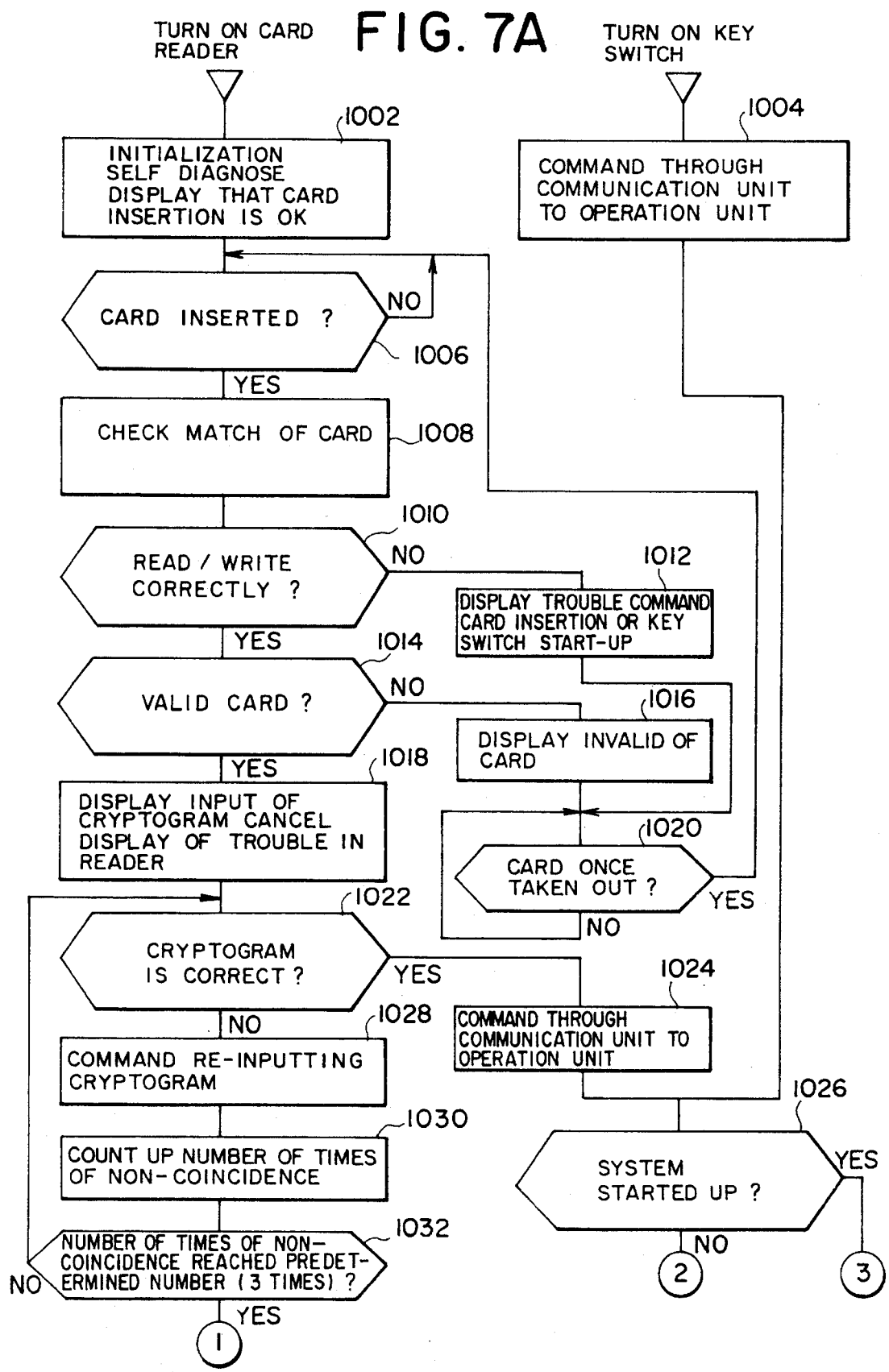

APPARATUS AND METHOD FOR AUTOMOBILE CONTROL USING A CONTROL CHARACTERISTIC WHICH CAN BE ADJUSTED BY THE DRIVER

This application is a continuation of our U.S. application Ser. No. 597,339, filed Oct. 15, 1990, now abandoned.

BACKGROUND OF THE INVENTION

The present invention relates to automobile control systems and more particularly to an automobile control system and method by which the driver can change the control characteristic of the automobile.

Conventionally, automatic transmission control is provided in accordance with a preset shift diagram, for example, in an automatic transmission control system for an automobile. For example, see Japanese Patent Publication JP-A-61-274155 filed by Hino Motors Limited on May 28, 1985. Several modes are set in the shift diagram and can be used selectively. These shift diagrams are written beforehand in a memory of the control system. Therefore, the driver's intention cannot be reflected in the driving characteristics.

Conventionally, it is possible to select one mode from various preset transmission modes, but the number of available modes to be selected is small and the modes typically are not satisfactory. For example, even if one mode is selected, the pattern of a shift diagram set as that mode is not necessarily satisfactory for the driver because the manner of driving the automobile varies with each driver as does the state of the road along which the automobile travels.

It is desirable to reflect the driver's intention on the quantity of assist of power steering, for example, in addition to transmission control. Conventionally, only vehicle assessories such as an electrically moved mirror and a seat, which are difficult to control during driving, and devices which are unrelated to control of other devices, are adjustable.

However, it is difficult to reflect the driver's intention on the characteristics of engine control and vehicle driving control.

SUMMARY OF THE INVENTION

It is an object of the present invention to provide an automobile control system and method by which the driver is able to change preset values or operating characteristics.

In order to achieve the above object, according to the present invention, a rewritable storage is provided in which data on control characteristics including set values is stored. The contents of the stored control characteristics are rewritable in accordance with the driver's commands. The storage region of the storage is separated into smaller regions one for each driver. A driver identification unit is capable of selecting a storage region for each driver.

In order to improve the operability and safety of the control system, a display for the rewritten state of the storage and a diagnosis unit may be provided.

The rewritable storage may include a storage medium such as an EEPROM, a RAM and an NVRAM backed up by a power source, or a magnetic memory for storing data which prescribes the operating state and characteristics of a control unit.

The control unit is capable of outputting control signals on the basis of data stored in the storage, sensor signals from sensors, and, when required, output signals from monitors which monitor the state of a controlled object.

An input unit for a driver may include, for example, a keyboard, switches, and a control lever. The driver is able to input desired set values, and control characteristics using this input unit when required.

The storage may be rewritten in accordance with a setting or change commanding signal from the input unit, and, when required, in accordance with sensor signals, controlled state monitoring signals or the current contents of data stored in the storage.

The driver identification unit identifies a driver and selects a storage region for control data for that driver depending on the result of the identification. To this end, for example, the driver may input or select his registered number using the keyboard or switches. The storage may be separated from the control unit and be of a portable type for the drivers own use such that the driver is identified automatically or data to be used is selected by mounting the storage on the control device. The identification unit may permit easy setting of data desired by each driver.

The diagnosis unit checks whether the driver identification unit, the rewritable storage, etc., operate correctly. If not, the diagnosis unit selects a different storage in which preset data used by the control unit is stored beforehand for reading purposes. Thus, the safety of the identification unit and storage is improved when failure occurs.

The display unit provides the driver with visual information about whether the storage is rewritable in accordance with the driver's intention (for example, the result of checking whether the allowable rewrite range is exceeded), about whether rewriting is ended correctly or about the result of the diagnosis by the diagnosis unit concerning whether problems occur. Thus, operability and safety are improved.

BRIEF DESCRIPTION OF THE DRAWINGS

FIG. 3 is the overall block diagram of a system;

FIGS. 4A–4G indicate the operational modes of the system;

FIG. 6 an illustration of a display screen;

FIGS. 7A and 7B are flowcharts indicative of system start-up by a card;

DESCRIPTION OF THE PREFERRED EMBODIMENTS

An embodiment of an automobile control system according to the present invention will be described hereunder with reference to the drawings.

Figure 1:
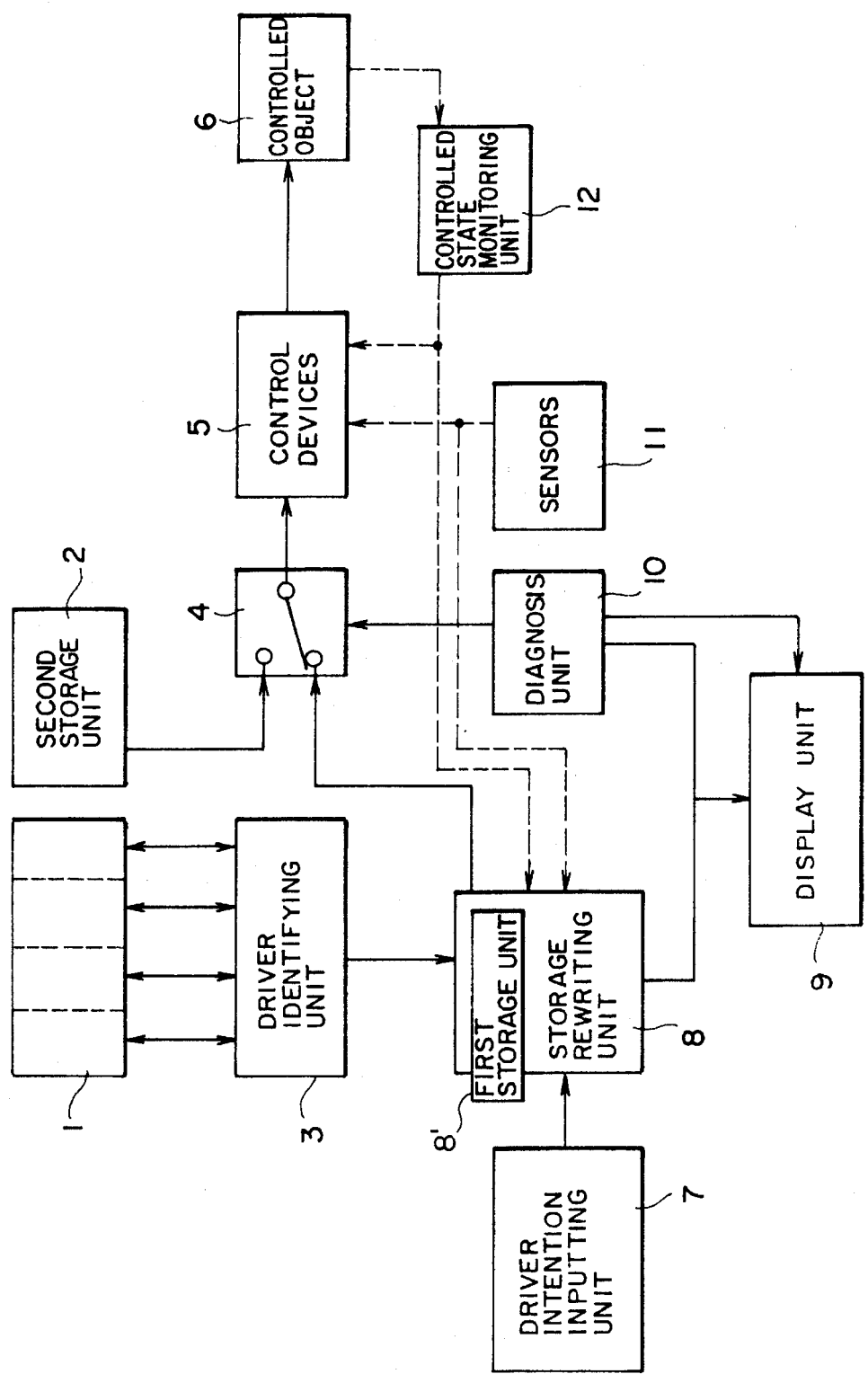
FIG. 1 is a block diagram indicative of the structure of the present invention.

FIG. 1 is a functional block diagram indicative of a first embodiment. If a driver identification cryptogram is inputted using an input unit device 1, for example, which reads an identification card in which the driver's cryptogram is stored, an identification device 3 confirms it and sends an identification signal to a storage rewriting unit 8 having a first storage unit. The first storage unit 81 stores data on a characteristic corresponding to each driver. The storage rewriting unit 8 checks whether the identification signal matches with data on a driver registered in the first storage unit 81. If not, the display unit 9 displays that fact. By manipulating an input unit 7, the driver display and stored data in the first storage unit is changed. The data read from the first storage unit by the storage rewriting unit 8 is delivered to a control unit 5 through a selector 4 to control a controlled unit 6 in accordance with the control characteristic related to the data. The control unit 5 uses the output signals from sensors 11 and a controlled-state monitor 12 when required for controlling purposes. A diagnosis unit 10 examines the operation of the storage rewriting unit 8. When the operation of the storage rewriting unit 8 is abnormal, the selector 4 selects a second storage unit 2 and the control unit 5 controls the controlled object 6 in accordance with data read from the second storage unit 2. A display 9 displays this fact. The controlled object 6 includes an automatic transmission, a power assist unit of a power steering device, and the engine. In this case, the data from the first or second storage unit are conditions for shifting up/down the transmission, a quantity of assist for power steering, and a fuel supply characteristic used when the engine is accelerated/decelerated.

The functional block diagram of FIG. 1 is realized by a computer program which will be described in more detail later.

Figure 2:
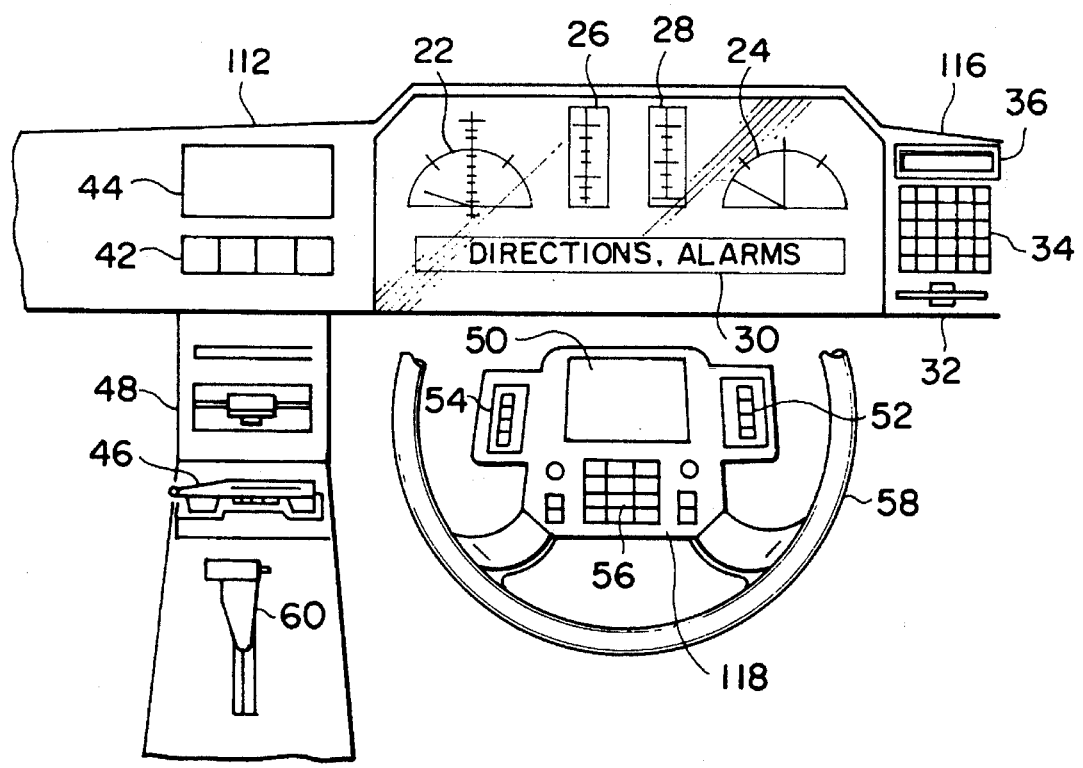
FIG. 2 shows an instrument panel and a steering wheel of a car.

FIG. 2 illustrates the appearance of a part of the instrument panel as viewed from the driver's seat of an automobile to which the control system as an embodiment of the present invention is applied. Displays 22 and 24 at the center of the dashboard display vehicle speed and engine speed, respectively; displays 26 and 28 display the temperature of cooling water and the remaining quantity of gasoline, respectively; and a display 30 displays a command and an alarm. These displays constitute a display unit 110 which displays the operating state of the engine and its designated alarm; the operating state of the power steering unit and its designated alarm; and the state of the transmission and its designated alarm. The state of the vehicle body and its designated alarm are also displayed at the dashboard. Namely, the display unit displays data required for driving the engine, power train system and vehicle body.

A card reader 32, an operated key unit 34 and a display 36 which constitute a card unit 116 are provided on the right side of the display unit 110. A card which stores data on an individual such as a personal desired characteristic and his cryptogram, is inserted into the card reader 32 for reading and writing purposes. The system may be started up by operating a key switch or the card unit. As will be described in more detail later, the engine can be started up by operating the card unit without using the key switch.

Provided on the left side of the display unit 110 are an operated key 42, a display 44 and a communication unit 46 such as a telephone set used for communication with an external station. These units constitute a communication unit 112. Thus, diagnosis of the system in accordance with commands from an external station and reception of data, for example on navigation, from an external station are feasible, and transmission of data from the system to an external station is performed. Thus, diagnosis of an automobile for failures, various designations involving the diagnosis, designation of information on roads and an automatic payment for the use of toll roads can be made using external stations.

A disk drive 48 forms part of a disk unit 144 for storing data. It permits storage of necessary data as well as inputting and outputting of a program in the control unit open to individuals in the system. The disk drive 48 may be used for writing a program for data communication with an external station through the communication unit, storing data used in the communication and for reading commercially available programs prepared by software suppliers.

Provided at the center of a steering wheel 58 is a system operation unit 118 which includes a display 50, operated switches 52, 54 and a data inputting unit 56, for example, a key pad of key switches. While the respective units constituting the system may be operated by the corresponding input units, they may be controlled through the operation unit 118 separately from the respective input units for the corresponding units once the system has started up. Furthermore, the respective units may be combined systematically through the communication unit to provide various new functions. The operation unit may be operated by an external station when connected.

The start-up of the system itself may be performed by two methods, namely, by the key switch and by the operation of the card unit. There are several kinds of systems, namely, a system in a ROM program using no disk drivers and a system in a disk driver. When the system which is already started up is to be re-started up by another kind of system, it may be done only by the operation unit alone without relying on the above key switch or card unit.

In FIG. 2, a select lever 60 for the automatic transmission unit is provided adjacent the driver's seat to perform automatic transmission/parking operations. Television, radio and telephone sets and other units (not shown) are provided.

FIG. 3 is a block diagram of the system. An engine control unit 102, transmission unit 104, air conditioning unit 106, power steering unit 108, display unit 110, communication unit 112, disk unit 114, card unit 116, operation unit 118, and another unit 120 are connected to an optical transmission line 124 and an electrical transmission line 126. A battery 100 supplies electrical energy to the respective lines through a power source line 122. Since the engine control unit 102, transmission unit 104, air conditioning unit 106 and power steering unit 108 are related closely to one another, they are interconnected through special purpose lines generally designated at 128 which are independent of transmission lines 124 and 126, but are not intended for multitransmission.

FIGS. 4(A)–(G) illustrate the operation modes of the system. The respective control units of FIG. 3 receive part of data from other units and operate in principle independently of each other. While the system diagnoses itself, the respective units diagnose themselves in principle, and backup units one for each unit are used when required.

FIG. 4(A) illustrates the operation of the operation unit. The system is started up to be placed in an operational mode by operating the key switch or the card switch when it is at a stop. In the operational mode, the operation unit issues a start-up command A to other units. If the system is not started up, other units may be started up (operated) by operating the key switch. At this time, determination that the system is abnormal may be made and the back-up units are selected to cause them to issue a start-up command A. When the operation ends, the driver operates the key switch or instructs the operation unit to give a stop command B. A required control unit may be operated to move the automobile by operating the key switch even when the system is abnormal.

FIG. 4(B) illustrates the operational mode of the engine control unit. The unit shifts from a stop mode to a standby mode in accordance with a command A. Namely, when the system is started up by the card unit to issue a start-up command to thereby cause electric power to be supplied to the engine control unit and thus to bring about a standby mode. In this mode, the control unit itself is already in its operating state while no engine starting command is issued. In response to an engine start-up command, the control unit starts up the engine and then shifts to an engine operating mode. The control unit generates a signal C indicative of start-up during engine start-up while it generates a signal D during engine operation.

The engine is stopped when the control unit receives a stop command signal B from the system. A shift to the respective modes may be made by operating the key switch irrespective of a command from the system. While it is for backing-up the system when the system is abnormal, it is also for realizing an old person's or a female person's desire to drive an automobile easily. When the key switch is switched off, the main power source for the engine control unit is interrupted, and the unit and the engine also stop.

As shown in FIG. 4(C), the automatic transmission unit is started up by a signal A from the operation unit or by operating the card unit and changes from a stop mode to a standby mode. The automatic transmission unit performs a self diagnosis in this mode and starts an operational mode when the standby mode stops. Therefore, even before the engine enters a startup mode, it can operate. The automatic transmission unit stops in response to a signal B indicative of a stop command from the driver. When it fails, a backup mode starts. The automatic transmission unit may be started or stopped by operating the key switch alone, like the engine control unit and other units. The reference characters A and B also denote signals A and B and signals indicative of the on-off operations of the key switch.

FIG. 4(D) illustrates the operation of the automatic air conditioning unit. It shifts from a stop mode to a standby mode under the condition A of FIG. 4(A). In the standby state, display and temperature setting are enabled. The operation of the automatic air conditioning unit is started under the condition C indicative of engine operation.

When the automatic air conditioning unit fails, the backup unit starts and the former stops under the condition B.

FIG. 4(E) shows the operational mode of the display unit. When the automobile is at a stop, namely, in a parked state, the display unit is in a standby state under which condition a minimum display, for example, of time is made. When a display command is received, for example, from the operation unit, the corresponding display is made.

A mode 1 in which displays are checked is selected under the condition C in which the engine is in a start-up mode. It is checked whether display is disabled or not. A mode 2 is then selected under the condition D indicative of engine operation. When a failure occurs, the backup unit starts to operate. When display is not made even under such condition, the system operates for backup purposes. Namely, when no display can be made at the center of the dashboard, display is made on a display screen of the operation unit. The display unit returns to its standby mode under the condition B.

FIG. 4(F) shows the communication unit which is in a standby mode when the automobile is in a parked state and when the engine control unit is at stop. Under such condition, the need for internal transmission of data in the automobile is low, so that an electrical transmission line where power consumption is low is operated while the optical transmission line is stopped. Then, the communication unit starts to operate under the condition A and thus transmission is made through the optical transmission line. When an abnormality occurs, the backup operation starts.

FIG. 4(G) illustrates the operation of the card unit and disk unit. By turning on the power source switch, those units are put in a standby state and start their operation by self diagnosis. Since the power source voltage is lowered at the start-up of the engine, those units are put in a standby state where no reading and writing operations are performed at the start-up of the engine.

Figure 5:
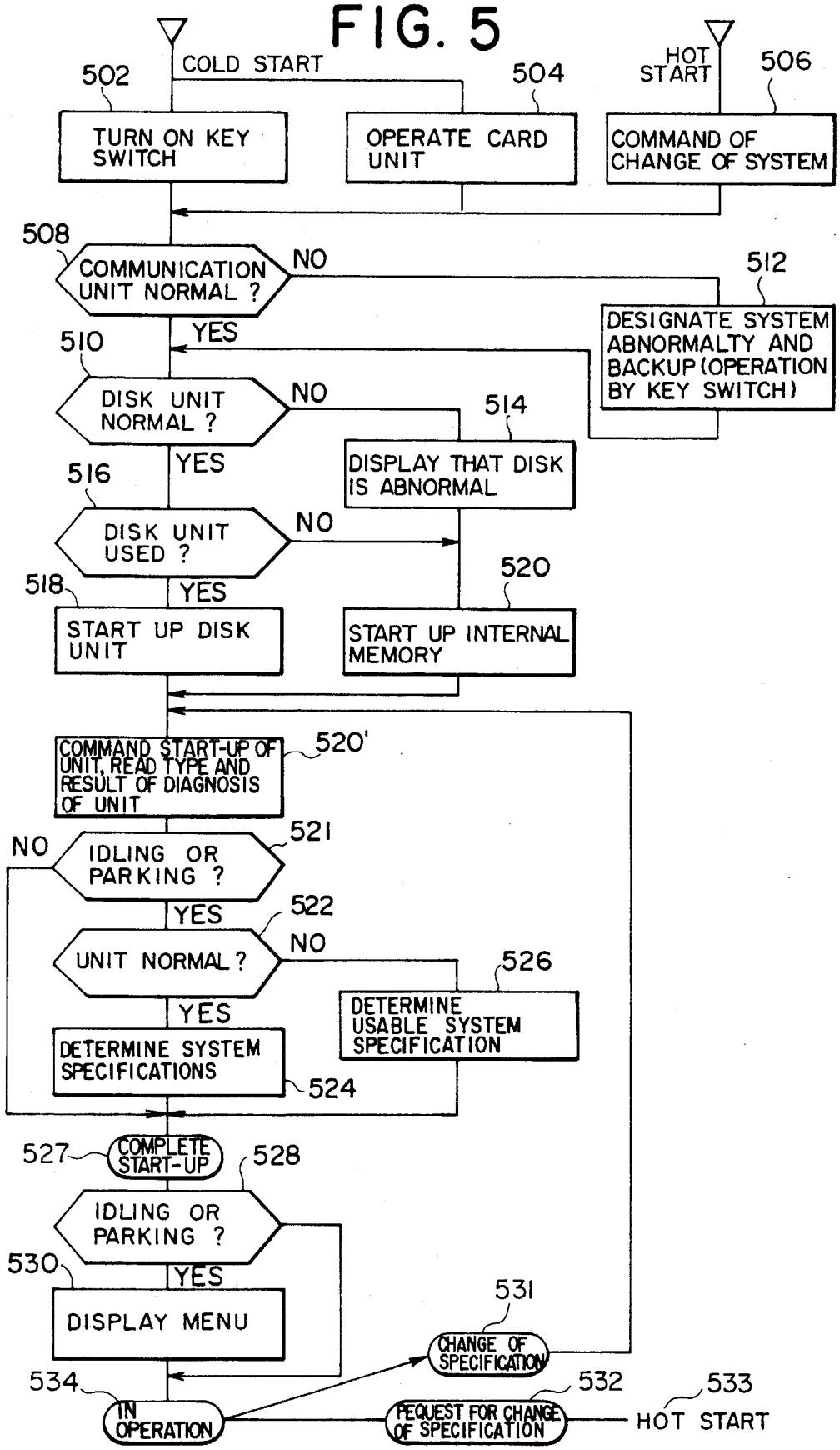
FIG. 5 is a flowchart indicative of the system start-up.

FIG. 5 is a flowchart indicative of the start-up of the system. The start-up of the system is separated into two parts, one concerning the start-up of the system from its stopped state, which is hereinafter referred to as "cold start". The other includes changing the system which is already started up to another system, which is hereinafter referred to as "hot start".

The cold start includes a start 502 by the key switch and a start 504 by a card. The conditions of the start-up is to use the key switch or to input a cryptogram of the card to prevent the theft of the automobile. The details of step 504 will be described later. When it is confirmed that the input cryptogram is true, control passes to step 508 even if no key switch is used.

When there is a system change command at the hot start, a shift is made from step 506 to step 508. The step 506 is executed on condition that the automobile is at a stop or when the engine is in an idling state or when the select lever 60 is at the park position.

At steps 508, 510, it is checked whether the communication unit and the disk unit are abnormal. When the communication unit is abnormal, backup is determined depending on the contents of the abnormality. For example, when the internal optical transmission line has some trouble, the electrical transmission line is used to lower the performance of the communication unit or disk unit for operating purposes. When the communication line connected to an external station is abnormal, the internal transmission is made normally. When none of the optical and electrical transmission lines can be used, the system does not start-up, at which time the respective units operate separately by operating the key switch.

When the disk is abnormal, it is not used and the system in the internal memory is started up at which time the disk abnormality is displayed at step 514.

At step 516, it is determined whether start-up is made by the system stored in the disk or by the internal memory. When the power source for the disk is off or no system program is set in the disk, start-up is made by the system program stored in the internal memory at step 520. When the system program is set in the disk, the disk is read at step 518 to thereby start up the system program stored in the disk. Thus, improvements to the system are facilitated, so that the creation of the system is made feasible even in a software house.

At step 520, the control unit delivers a signal A of FIG. 4 to the respective units. It also receives reports about the type of the respective units and the result of the diagnosis of the units. At step 522, the control unit determines whether the units are normal. If so, control passes to step 524 while if not, it passes to step 526.

The details of steps 502 and 504 of FIG. 5 will be described using FIGS. 7A and 7B. When step 502 of FIG. 5 starts (the key switch is on), control passes to step 1004 of FIG. 7A where a command is given to the operation unit 118 via the communication unit 112. Control further passes to step 1026 where it is determined whether the system is already started up. If so, control passes to step 1040 of FIG. 7B where a signal is generated indicating that the card is effective or valid and the operation indicated by the flow of FIGS. 7A and 7B is terminated.

Figure 7B:
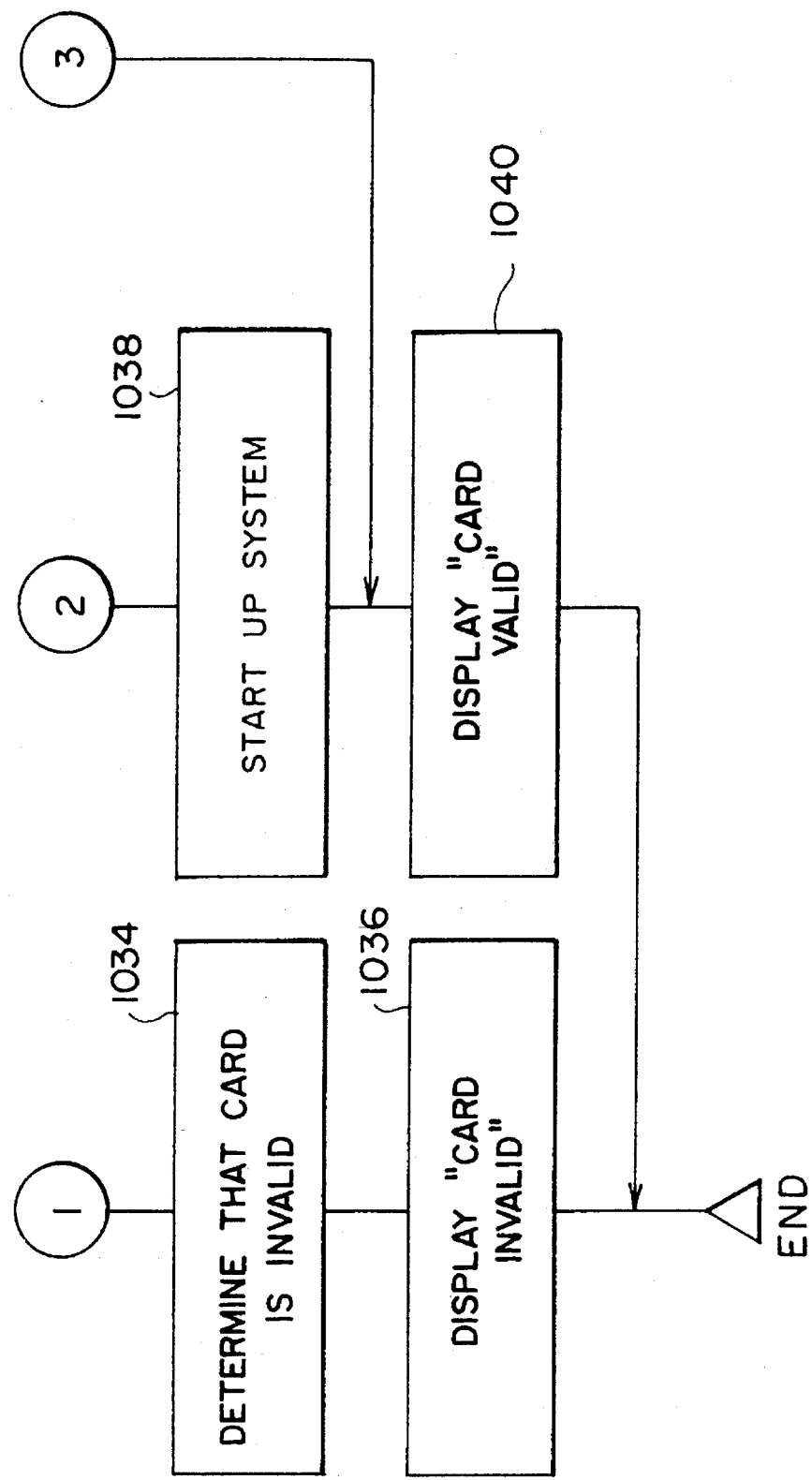

If the system is not yet started up at step 1026, the system is started up at step 1038 and control passes to step 1040 where a signal is generated indicating that the card is effective or valid and the operation indicated by the flow of FIGS. 7A and 7B is terminated. If this flow is terminated, control passes to step 508 of FIG. 5.

When a step 504 of FIG. 5 (operation by the card unit) starts, the control unit performs initialization, self-diagnosis and display of permitted card insertion at step 1002 of FIG. 7A. Thereafter, at step 1006, it is determined whether the card insertion has been completed. If not, the card insertion is awaited. At step 1006, if the card is inserted, control passes to step 1008 where it checks whether the card matches. At step 1010, it is determined whether read/write can be made correctly. If not, the occurrence of a failure is displayed at step 1012 and the display that start-up should be made by card reinsertion or key switch operation is made. After the processing at step 1012, control passes to step 1020 which will be described later in more detail.

When it is determined that read/write can be made correctly at step 1010, control passes to step 1014 to determine whether the card is true and effective. If the card is not true or effective, the ineffectiveness or invalidity of the card is designated at step 1016. Control then passes to step 1020 where it is determined whether the card was once drawn out. If not, control returns to step 1006 where the above operation is repeated. If the card is not drawn out at step 1020, control waits until the card is drawn out.

At step 1014, if the card is true and effective, it is displayed that a cryptogram should be inputted at step 1018 and the indication that the reader is at failure, if any, is erased. Thereafter, control passes to step 1022 where it is determined whether the input cryptogram is true. If not, the display indicates that a cryptogram should be reinput at step 1028 and the number of times of non-coincidence is counted up at step 1030. At step 1032, it is determined whether the number of times of non-coincidence has reached 3. If not, control returns to step 1022 where cryptogram inputting is repeated. If the number of times of non-coincidence reaches 3 at step 1032, control passes to step 1034 where the ineffectiveness or invalidity of the card is designated and the ineffectiveness or invalidity of the card is displayed at step 1036 and the operation indicated by the flow of FIGS. 7A and 7B is terminated.

If it is determined that the input cryptogram is true at step 1022, this fact is reported to the operation unit via the communication unit at step 1024. Thereafter, it is determined whether the system is already started up at step 1026. If so, it is indicated that the card is effective at step 1040 of FIG. 7B and the operation indicated by the flow of FIGS. 7A and 7B is terminated. At step 1040, it is determined that the system is not yet started up, the system is started up at step 1038 and then control passes to step 1040 where it is indicated that the card is effective and the operation indicated by the flow of FIGS. 7A and 7B is terminated at which time, control passes to the processing at step 508 of FIG. 5.

FIG. 6 shows a display on the image screen used at steps 524 and 526 where the specifications are determined by the driver. For example, if the driver wants to change the engine characteristic to his desired one, and use it, he inputs the numeral 2 in ( ) after "CHARACTERISTIC". This also applies to control of the transmission characteristics. For the air conditioning unit and the disk unit, "use" or "unuse" is input.

If there is only "standard" depending on type and "characteristic" is not open to individuals, 1 (unity) is forcedly input, so that no change is allowable. Lastly, when the result of the determination of the system specification is desired to be output preferentially from the outset, 1 (unity) is input in ( ) in the item 10. This result is set in the card and the already selected result is indicated in ( ) from the outset and the processing is completed only by the operation of the execution key. When the unit is abnormal, the abnormal unit is displayed on the display screen of FIG. 6 at step 526 and the use of that unit is forcedly determined. For example, when the air conditioning unit is abnormal, its unuse is selected forcedly.

If the specifications at steps 524, 526 are determined, they are delivered to the respective units and the start-up of the system is terminated.

Since the driver watches the display, steps 524, 526 are executed for danger averting purposes only under the conditions where the engine is idling or where the select lever 60 is in a parked state. This determination is made at step 521. Step 530 where a menu is displayed after the system is started up is made similarly only when the engine is in an idling state or when the select lever 60 is in a park state. If the automobile starts to move, the menu immediately disappears. If the specification is desired to be changed, steps 524, 526 are again executed in accordance with a command for that purpose.

Figure 8:
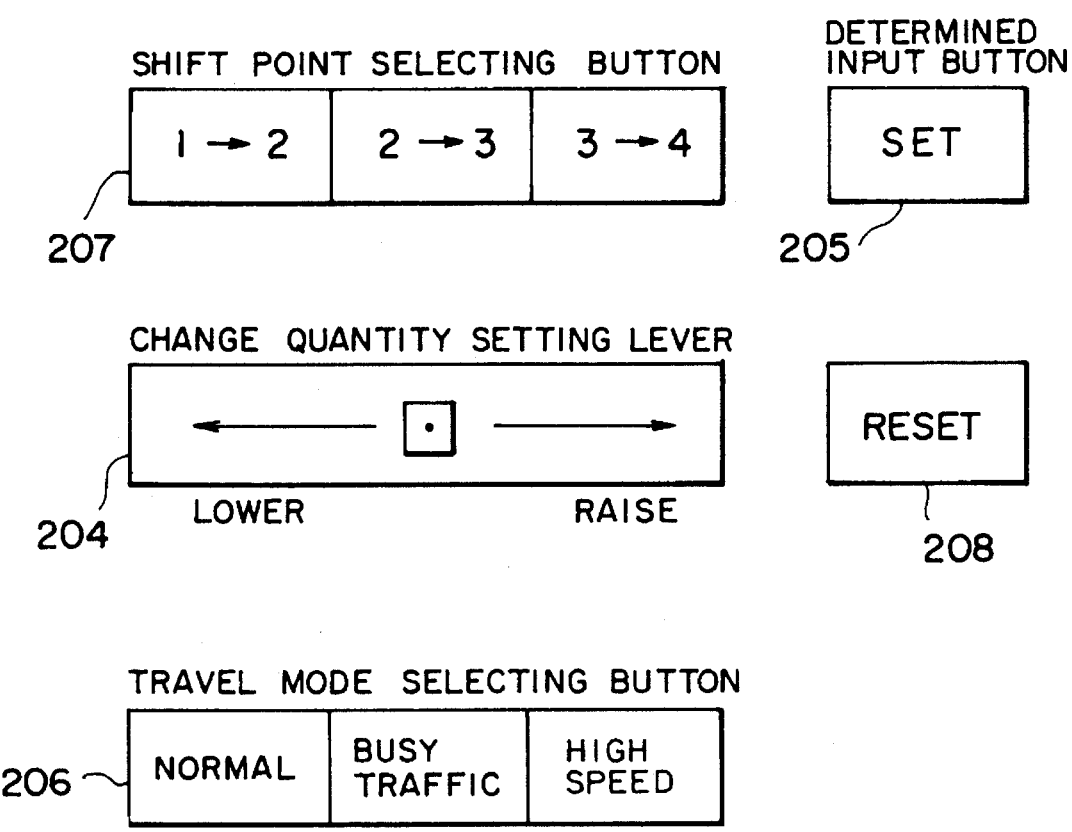
FIG. 8 is a schematic of a control panel for changing a transmission pattern.

In the above arrangement, an operation unit including a button and a lever of FIG. 8 is provided in the unit 56 of FIG. 2 to allow the driver to rewrite or change a transmission pattern of the automatic transmission.

Figure 9:
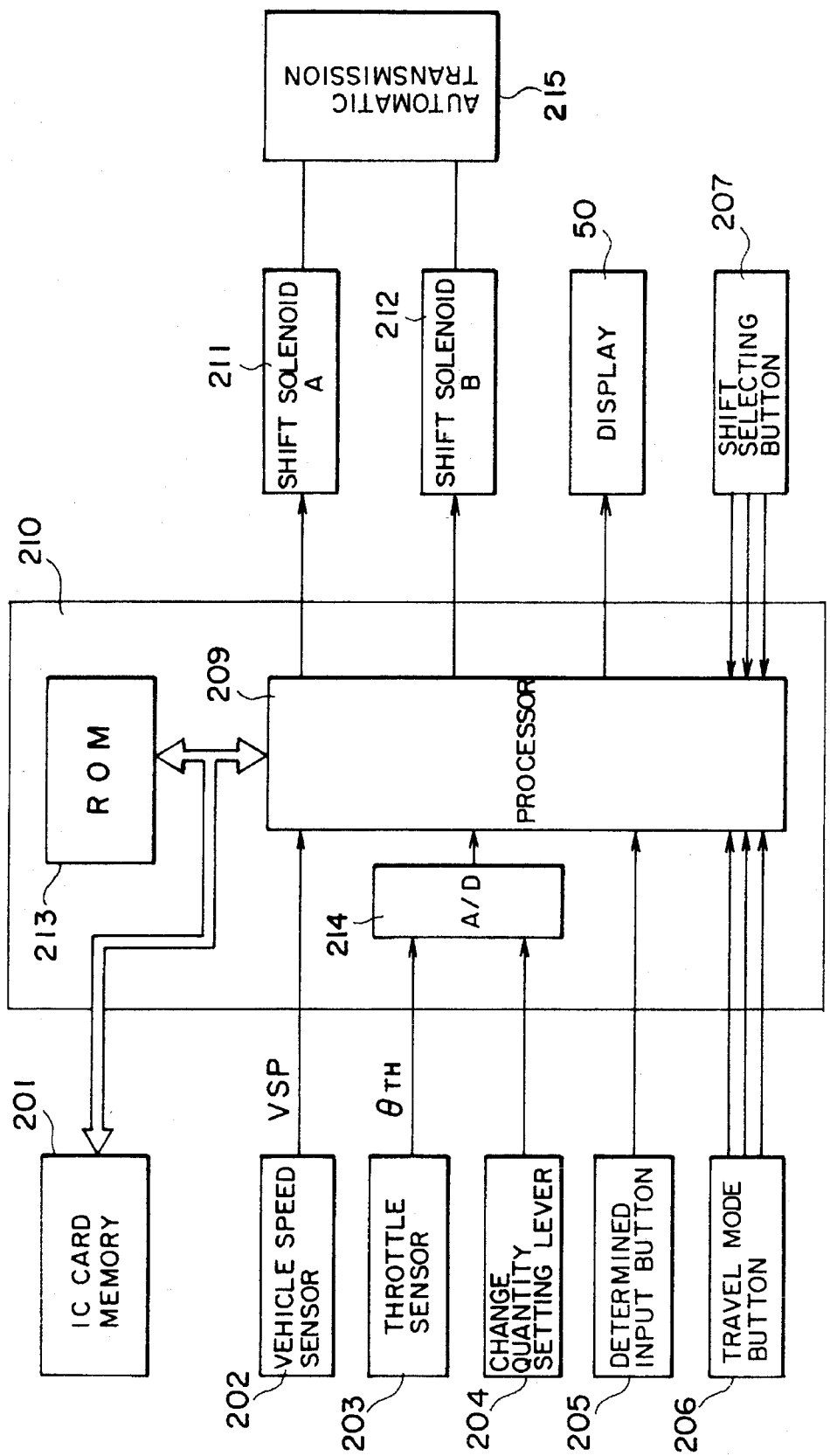
FIG. 9 is a block diagram of an automatic transmission control device.

FIG. 9 illustrates the structure of the automatic transmission control system (104 in FIG. 3) of the present embodiment. Transmission is made by controlling the combination of the on and off operations of shift solenoids A211 and B212 in accordance with a shift diagram shown by the characteristic 220a of FIG. 13 on the basis of a vehicle speed signal VSP from a vehicle speed sensor 202 and a throttle angle signal $\theta_{TH}$ from a throttle sensor 203. A control unit 210 further receives signals from a shift point selecting button 207, a change quantity setting lever 204, a determined input button 205 and a travel mode selecting button 206 in FIG. 8. The processing for changing the shift point will be described in more detail later. The stoppage of the processing for changing the shift point is made by a signal from a RESET button. The control unit 210 includes an A/D converters 214 which converts analog quantity output signals from the throttle sensor 203, etc., to corresponding digital quantity signals. A computing unit 209 uses a microprocessor which is connected to appropriate memories; namely, a ROM 213 built in the control unit 210 and an IC card memory 201 connected thereto through a card reader 32, as shown in FIG. 2. A RAM used when the computing unit 209 performs a computing operation is not shown especially and is built in the computing unit 209. In addition, a display 50 is also connected to the control unit 210 for the sake of various indications.

Figure 14:
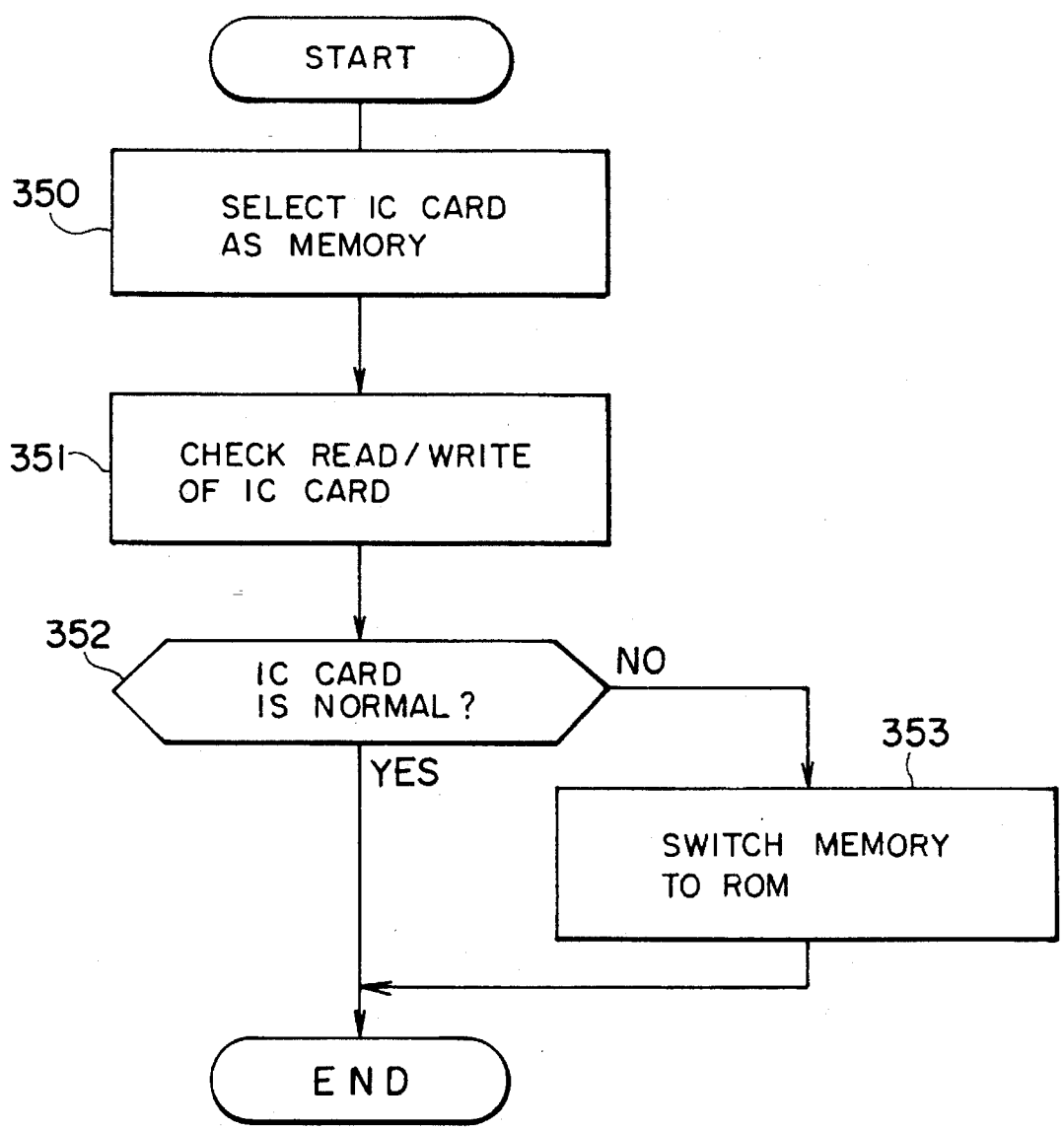
FIG. 14 illustrates procedures for changing a storage.

A program and data for transmission control are stored in ROM 213 while only data or part of the data may also be stored in a data region prepared in the IC card memory 201. The program is arranged such that if the IC card memory is normally connected and able to perform a normal operation, the IC card memory is preferentially selected and used. FIG. 14 shows selection of one of the ROM and IC card memory. The IC card memory 201 includes a NVRAM (Non-Volatile RAM) which stores the data when the power source is turned off.

Figure 10A:
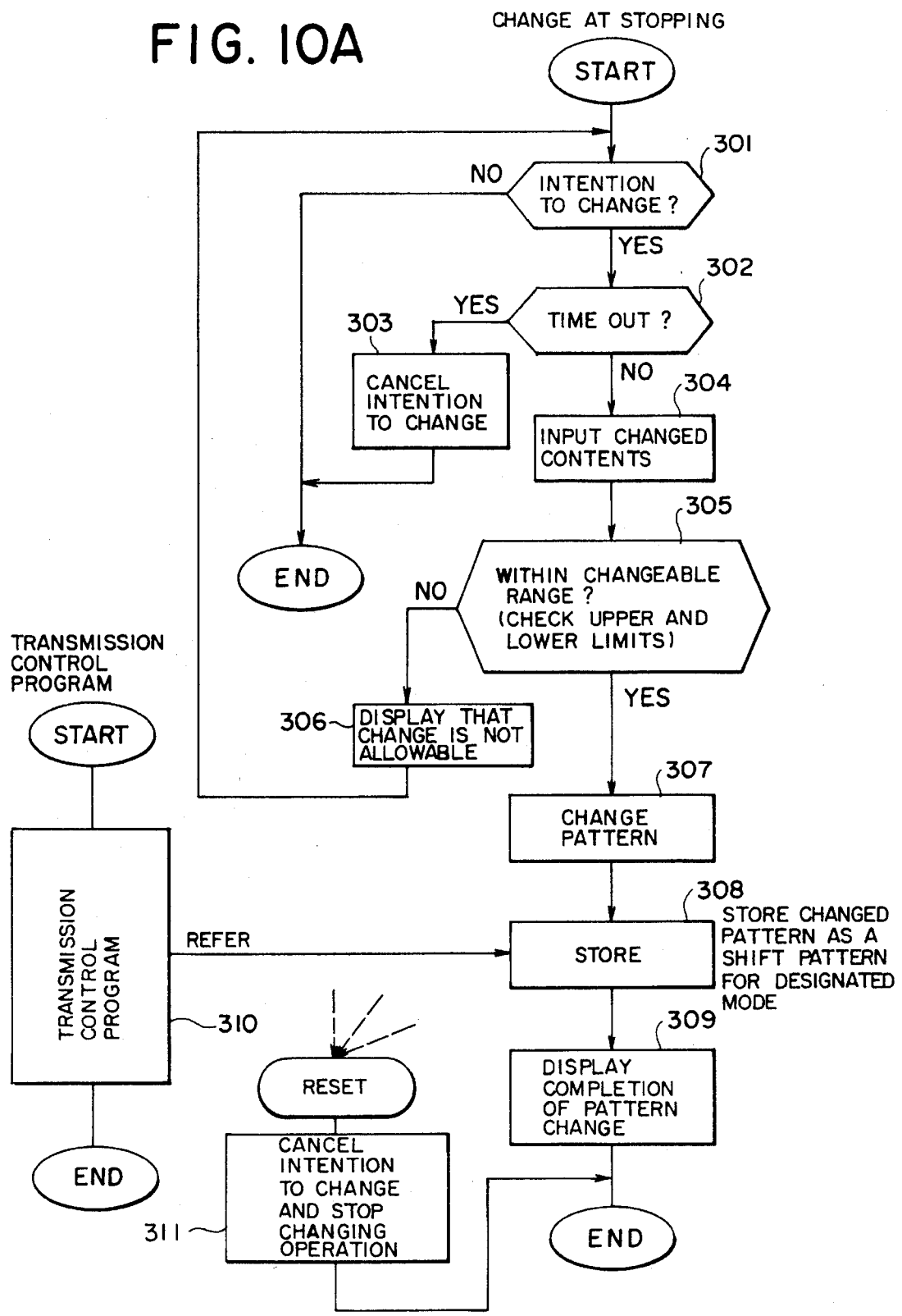
FIGS. 10A and 10B illustrate procedures viewed from the control unit side for changing a transmission pattern at a stop.
Figure 10B:
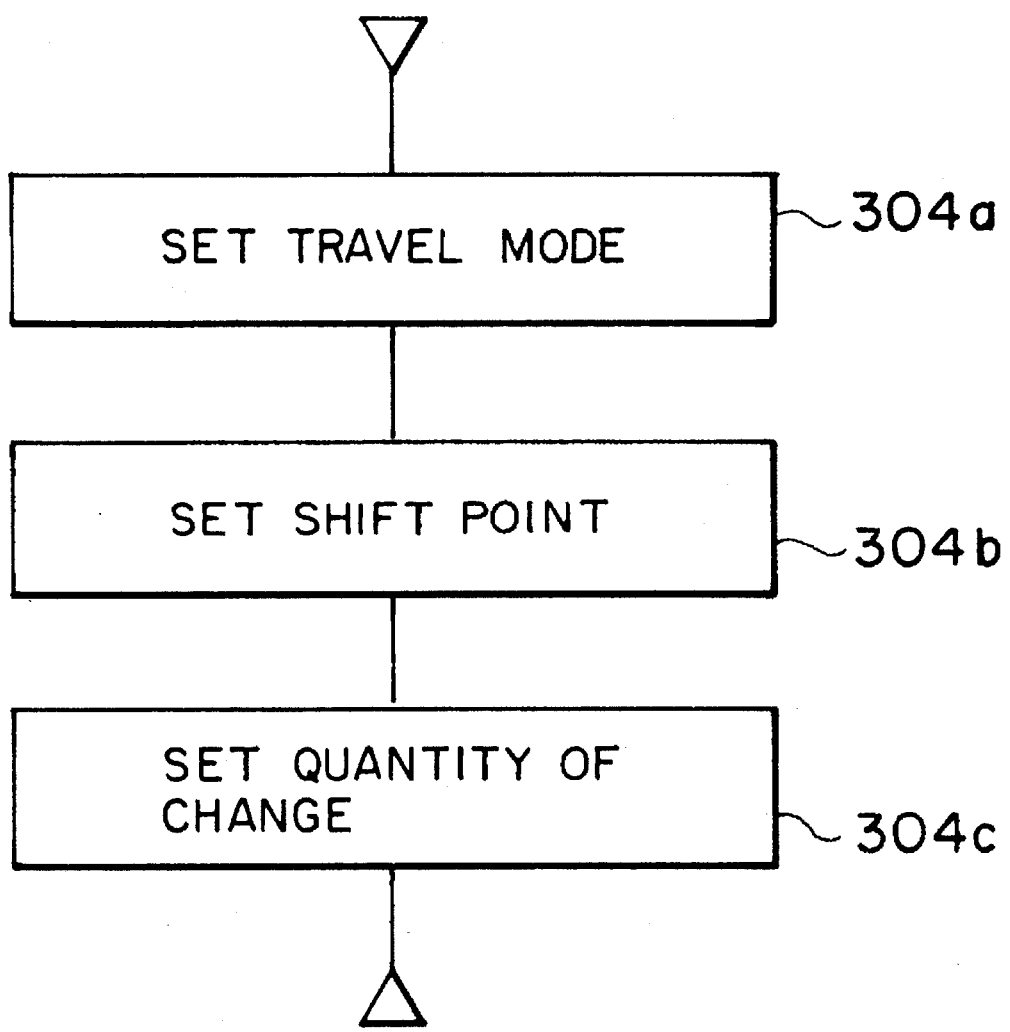
Figure 11:
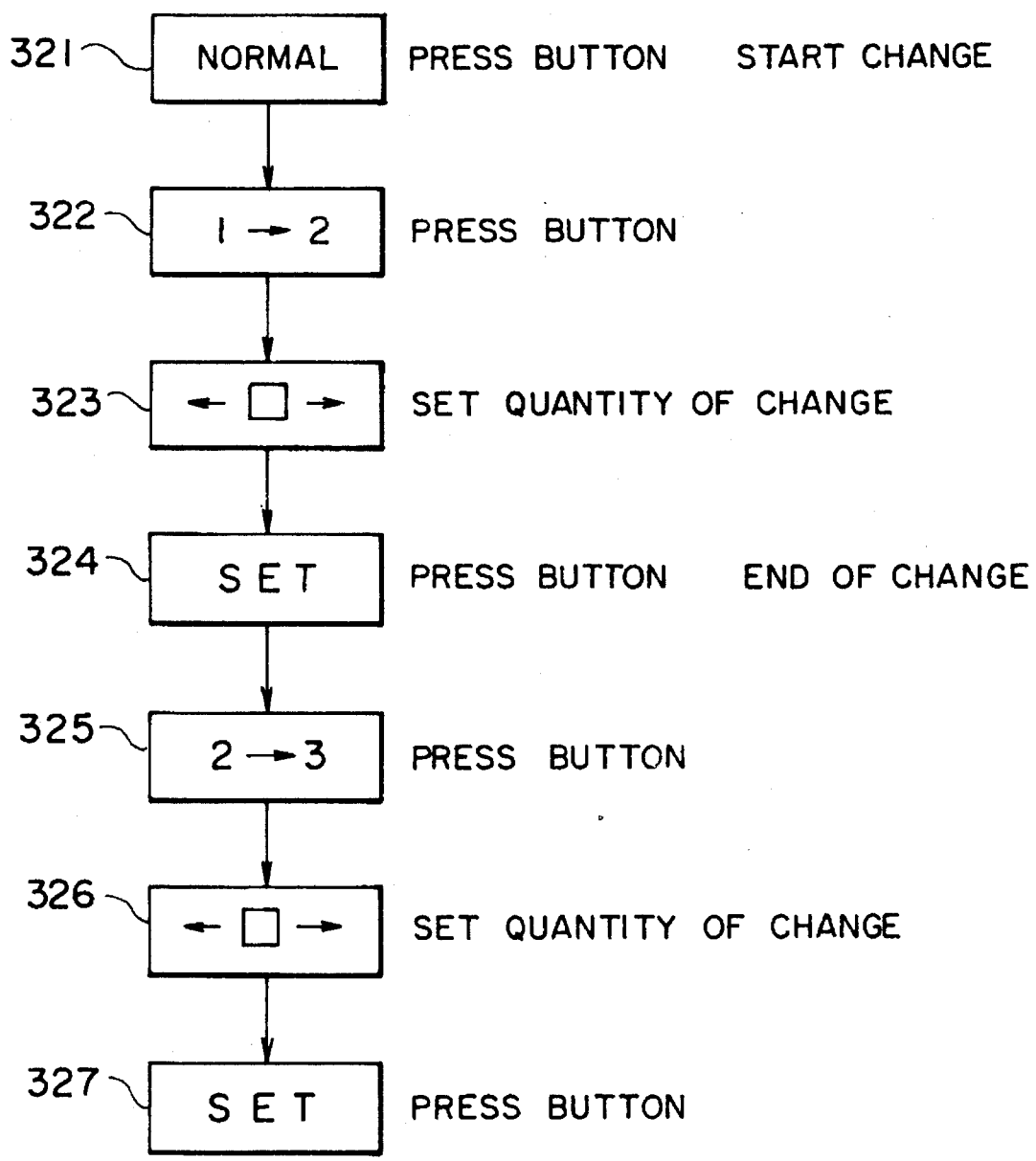
FIG. 11 illustrates procedures viewed from the driver side for changing a transmission pattern at a stop.

A process for changing a transmission pattern when the automobile is at stop will be described with reference to FIGS. 10(A), (B) and FIG. 11. The procedures for operating the devices, as viewed from the driver, are shown in FIG. 11 while the procedures for processing, as viewed from the control unit, are as shown in FIG. 10, which will be described below.

First, at step 301, it is determined whether the driver has an intention to change the transmission pattern by determining whether any one of the shift point selecting buttons 207 (FIG. 8) is pressed. If no buttons are pressed, it is determined that the driver has no intention and no data is rewritten. This becomes a signal indicative of the start of a change, which may be input by a special purpose switch. If any one of the buttons is pressed, it is determined that the driver has the intention and control passes to step 302. In order to improve the safety against an erroneous operation, time-out is checked at step 302. When the subsequent operations are not performed in a predetermined time even if the shift point selecting button is pressed, a change of the driver's intention is canceled at step 303 and the processing is terminated. At step 304, changed contents are input which include a travel mode, shift point, a quantity of change set by the buttons and levers in FIG. 8. In this case, data on a quantity of change set by the change quantity setting lever 204 is taken in as a set of data also including the data on the shift point selecting button 207 and the travel mode selecting button 206 pressed already when a determined input button (SET button) 205 is pressed.

At step 305, it is checked whether the input quantity of change is within an allowable range. If not, the display 50 displays at step 306 that it is an unacceptable request and prompts the driver to input data again. This is performed to prevent the impairment of the driver's safety and drivability which would otherwise occur as the result of permitting the driver a great change. If the input value is within the allowable range, a change of the transmission pattern (shift diagram) is made at step 307. In this case, if the position of the change quantity setting lever 204 is on the "shift-down" side, the vehicle speed at a transmission point (shift up point) for the same throttle opening is changed to the lower speed side; while if it is on the "shift-up" side, the vehicle speed is changed to the higher speed side. While in the present embodiment the vehicle speed is illustrated as being changeable only on the shift-up side, it is changeable similarly on the shift-down side if a shift up/down select unit is provided.

Figure 13:
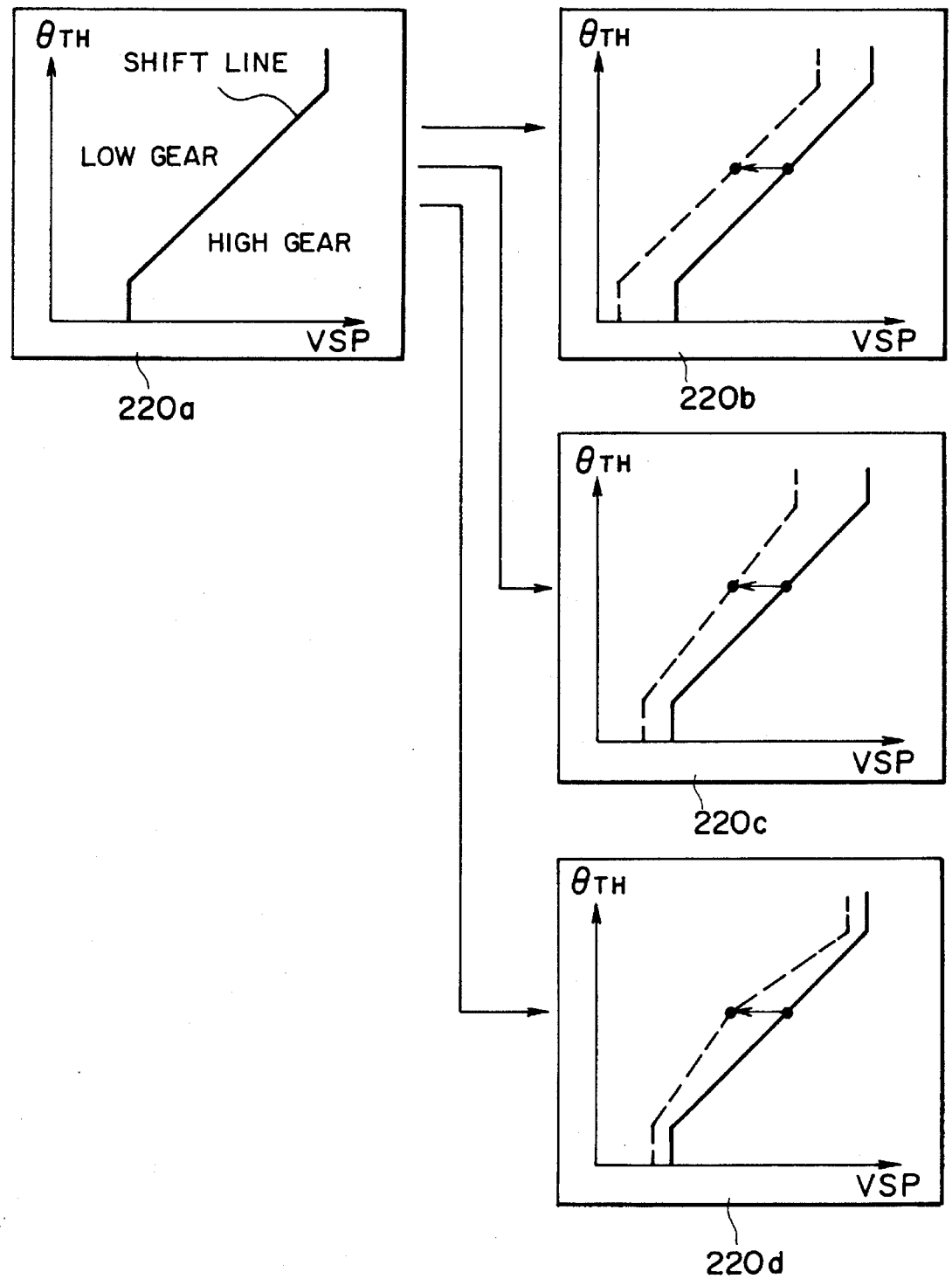
FIG. 13 is an example of changing a transmission pattern.

FIG. 13 illustrates several specified examples of changing a pattern at step 307. In each of these examples, the change quantity setting lever is set on the "push-down" side. The pattern 220b includes a parallel movement version of the original pattern 220a. In the pattern 220c, a change quantity is proportional to a throttle opening $\theta_{TH}$. In the pattern 220d, the change quantity becomes maximum at a specified throttle opening. Other measures may be taken for changing the pattern.

At step 308, the changed transmission pattern is written into the transmission pattern region in the IC card memory as a shift pattern for a designated mode. At step 309, the display 50 indicates that the above changing steps are all completed and informs the driver of this fact.

The steps 301–309 are all programmed in ROM 213 in which the step 310 of the transmission control program is also programmed. At step 310, transmission control is provided in accordance with the data on the transmission pattern written into the IC card memory at step 308.

As described already in FIG. 14, if the IC card memory 201 does not work normally, the initial data set beforehand in the ROM 213 is referred to and transmission control is then provided. In this case, no steps 301–309 for data changing are executed. At this time, the display 50 indicates this fact.

Figure 12:
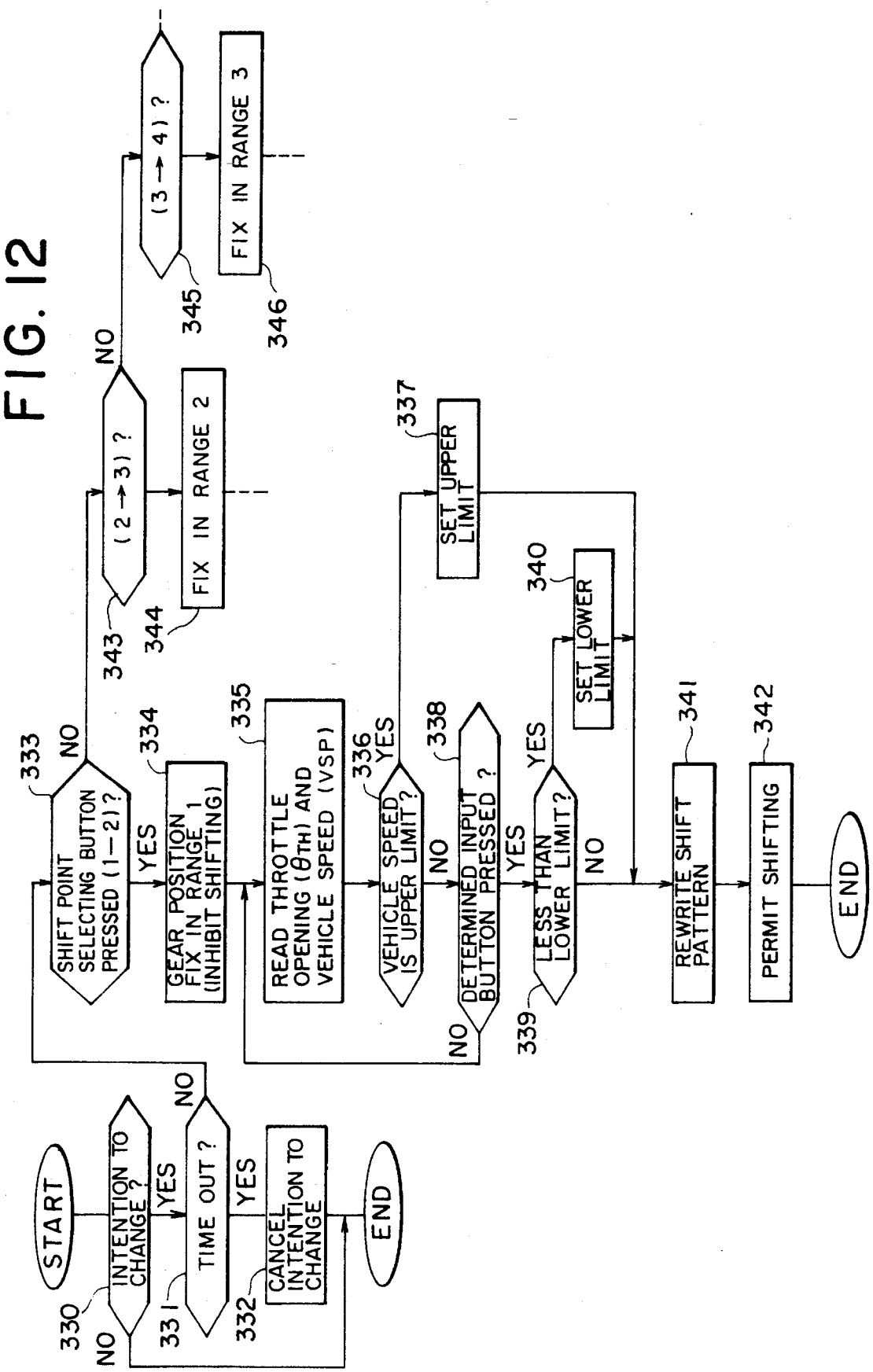
FIG. 12 illustrates procedures for changing a shift pattern during travel.

A process for changing the shift pattern during traveling will be described with reference to FIG. 12.

Steps 330, 331 and 332 are similar to the steps 301, 302 and 303 of FIG. 11. At step 333, the shift point selecting button is checked. If the (1→2) button is pressed, the step 334 and subsequent steps are executed. If not, control passes to steps 343 and 345. Since the step 344 and subsequent steps and the step 346 and subsequent steps are similar to the step 334 to 342, further description thereof will be omitted.

At step 334, the shifting operation is inhibited and the vehicle speed is fixed in the range 1. Under such condition, acceleration is made during which vehicle speed data VSP and throttle opening data $\theta_{TH}$ are read invariably at predetermined periods at step 335. At this time, if the vehicle speed reaches a maximum allowable limit in the shift range 1 for the throttle opening at that time before the determined input button 205 is pressed, the shift pattern is rewritten using the upper limit as the set value for the sake of safety and the shift operation is permitted and the vehicle speed is shifted up to range 2. These procedures are steps 336, 337, 341 and 342.

If the determined input button is pressed before the vehicle speed reaches the upper limit, the lower limit is checked similarly.

If the vehicle speed when the determined input button is pressed is within the range defined by the upper and lower limits for the throttle sensor opening degree at that time, the shift pattern is written into the IC card memory using the data on the vehicle speed and throttle opening at step 341. Namely, the old diagram is rewritten with a shift diagram passing through a point determined by the vehicle speed and throttle opening. Also, in this case, several rewriting methods as shown in FIG. 13 may be used.

By employing the processes describe above, the transmission pattern for the automatic transmission may be changed to the characteristic desired by the driver. In the present embodiment, the IC card memory is used as a rewritable storage. Therefore, if each driver has one IC card and sets it in the card reader when he drives, he will be automatically identified. Alternatively, a large capacity of memory (for example, a hard disk device) built in the system as a rewritable storage may be used to identify the driver by inputting the driver's ID No. through a driver identifying switch or keyboard to thereby change a storage region for data.

While in the present embodiment the automatic transmission control unit is illustrated, a characteristic desired by the driver may easily be set using a similar concept in any other control device such as a fuel injection control device, a spark ignition timing control device or a power steering device.

FIG. 14 is a flowchart indicative of the operation of the selector 4 and diagnosis unit 10 in a computer program which realizes the functional block diagram of FIG. 1.

An IC card constituting the first storage unit is preferentially selected at step 350. The read/write operation of the IC card is checked at step 351. It is checked at step 352 whether the IC card is normal. If the card is abnormal, standard characteristic data which is a second storage unit is selected at step 353.

Figure 15:
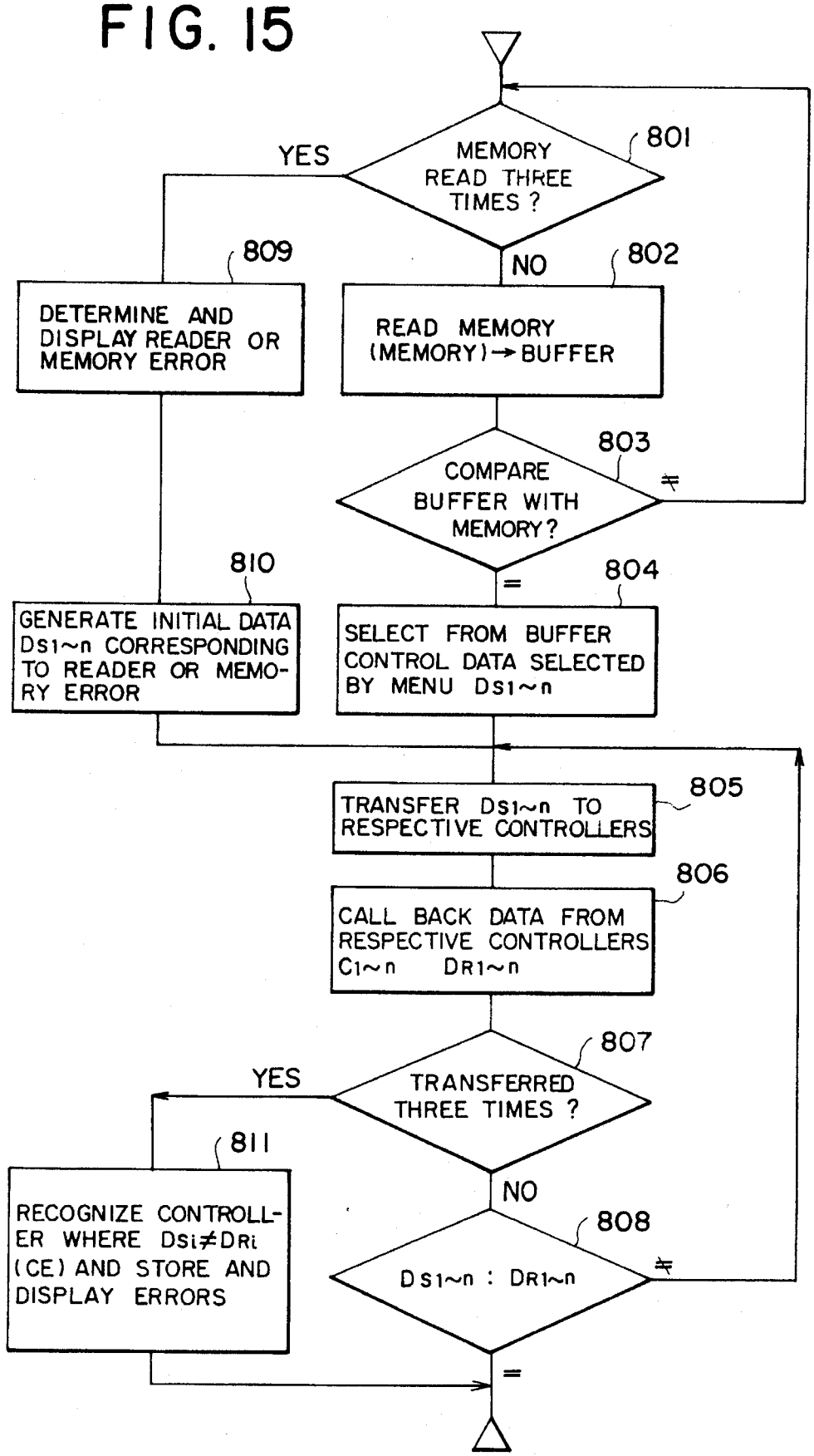
FIG. 15 is a flowchart indicative of reading data stored in a personal memory.

FIG. 15 illustrates the flow in which data stored in a personal memory is read by the reader. At step 801, it is checked whether the memory is read by the reader a predetermined number (plurality) of times. If so, it is determined that the reader or memory is in error at step 809 and the reporting unit reports this fact. If the memory is not read the predetermined number of times, control passes from step 801 to 802 to read the memory again. At step 802, the read data is input to a buffer memory. At step 803, the read contents of the buffer memory are compared with the again read contents of the memory. If both are equal, control passes to step 804. Otherwise, control returns to step 801. Namely, if a predetermined number of memory errors have occurred, it is determined at step 809 that they are reader or memory errors. This is done in order to increase the reliability of the error determination by detecting the predetermined number of times of occurrence of memory errors.

At step 804, the control data (for example, the numerical value shown in brackets of FIG. 6) selected by the menu is selected in the reader (Dsl–Dsn). At step 810, data which will be the initial value of control data is generated when the reader or memory is in error (Dsl–Dsn). At step 805, the initial values Dsl–Dsn of the control data are delivered to the respective controllers $C_1$–$C_n$. At step 806, the data received by the respective controllers $C_f$–$C_n$ are read by the reader. At step 807 it is checked whether data transmission at steps 805 and 806 is executed a predetermined number of times. At step 808, if it is confirmed that $D_{Sf}$–$D_{Sn}$ are identical in value to $D_{Rf}$–$D_{Rn}$, the reading and transmission of data from the memory are terminated. At step 811, the controller Ci and its transmission system where $D_{Si} \neq D_{Ri}$ are specified and classified in the CE, and errors are stored and displayed.

Figure 16:
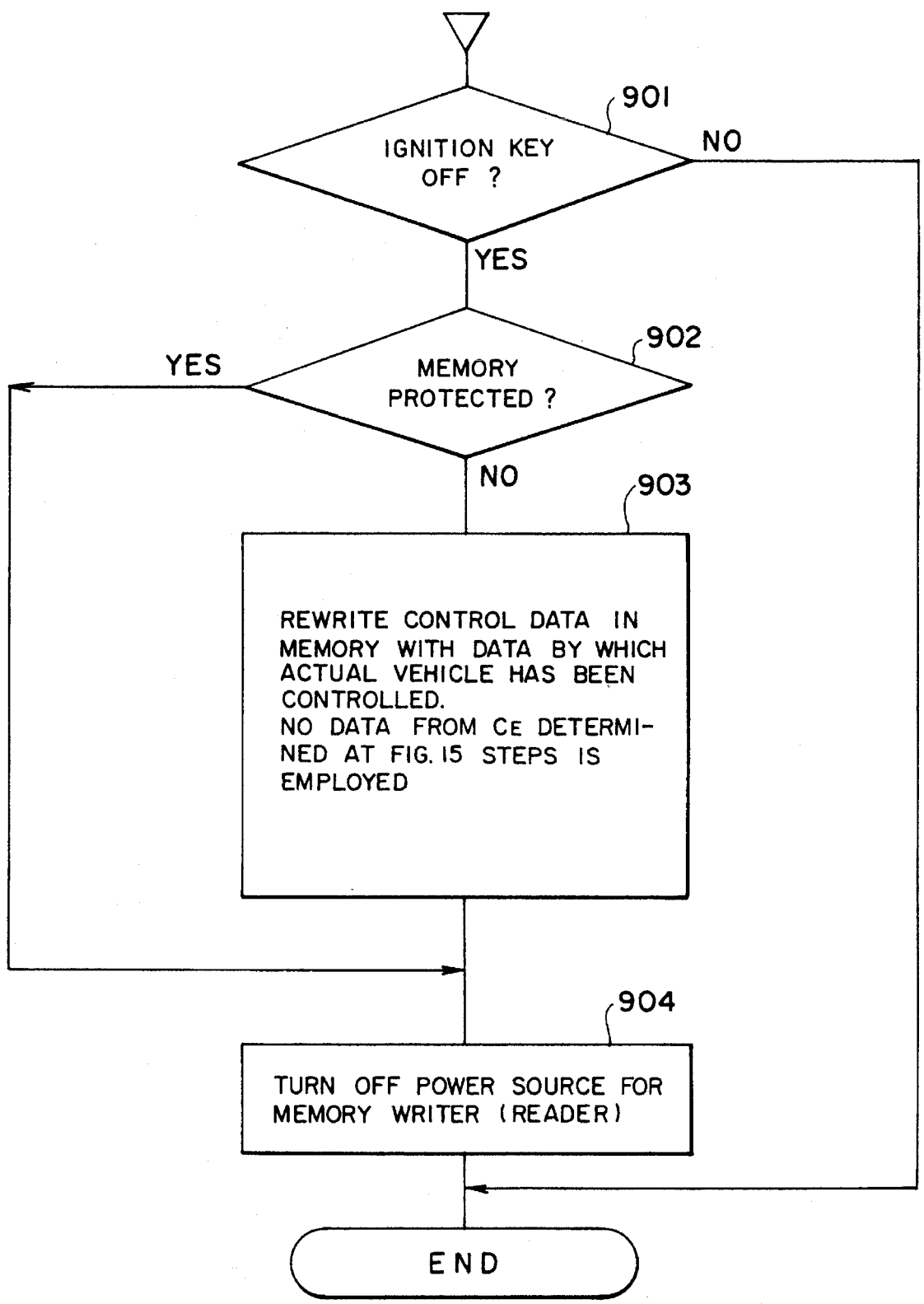
FIG. 16 is a flowchart indicative of storing data in the personal memory.

FIG. 16 illustrates the flow in which the control data selected by the driver and the control data corrected by the driver during the traveling of the automobile are stored in the memory. At step 901, the time when the ignition key is turned off is determined. At step 902, it is checked whether the memory is protected. This may be done, for example, by determining whether the power source voltage for the memory unit is at a prescribed value, although other methods may be used. If not protected, the final control quantity data for each controller is stored at step 903. At this time, the control quantity data from the controller and its system which are determined as being in error at step 811 are not stored. At step 904, the power source for the reader for writing and reading the contents of the memory is turned off and the processing is terminated.

Figure 17:
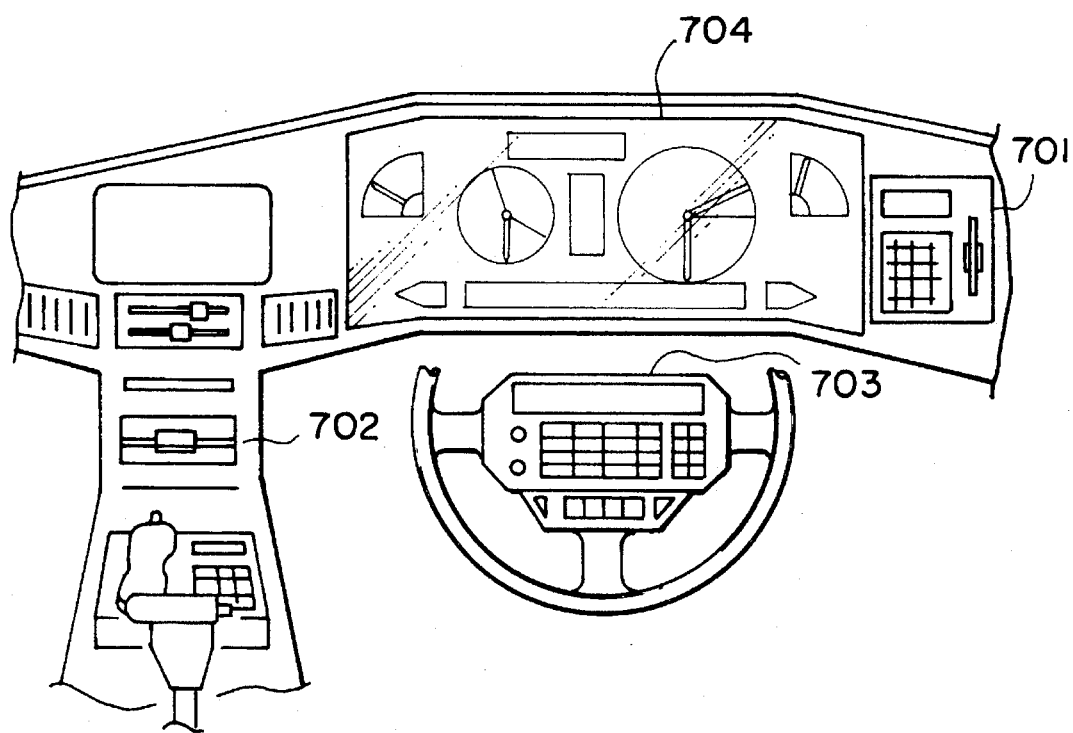
FIG. 17 illustrates an instrument panel and a steering wheel of a car.

FIG. 17 illustrates the appearance of a part of the driver's seat in another embodiment. Installed at the center of the dashboard are various meters 704 for display of the respective states of the automobile such as vehicle speed and engine speed and various designated alarms. A card unit 701 is provided on the right side of the meters. In addition, a memory unit 702 is provided on the left side of the steering wheel and an operation unit 703 is provided at the center of the steering wheel.

Figure 18:
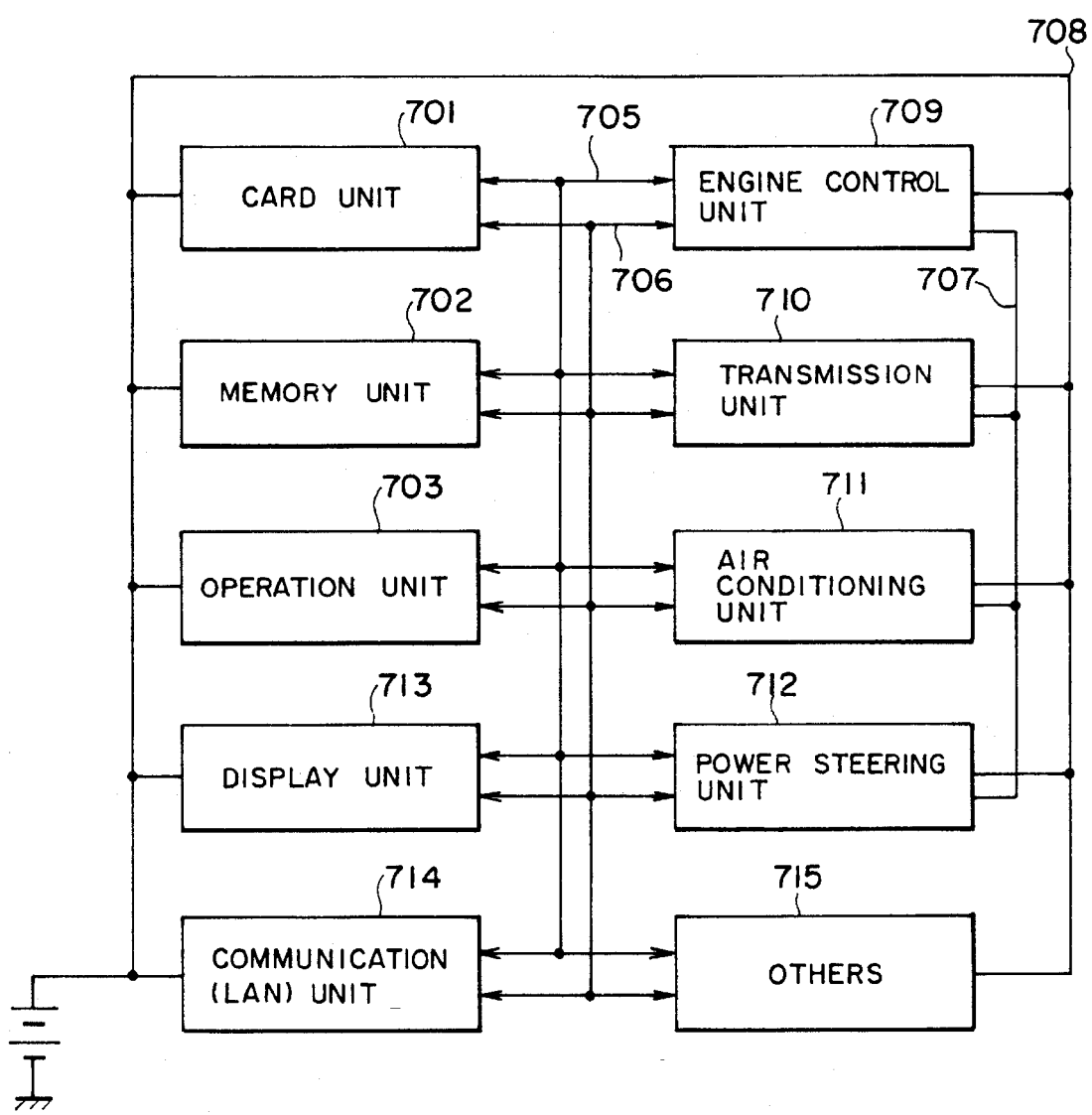
FIG. 18 is a control block diagram.

FIG. 18 is a block diagram of the system which includes the card unit 701, memory unit 702, operation unit 703, a display unit 713, communication unit 714, engine control unit 709, transmission unit 710, air conditioning unit 711, power steering unit 712 and another unit 715. Those units are connected to an optical multi-transmission line 705 and an electrical transmission line 706. Since the engine control unit 709, transmission unit 710, air conditioning unit 711 and power steering unit 712 are related closely to each other, they are connected by special purpose lines. A line 707 is here shown specifically. If a personal card is inserted into the card unit 701, data on the personal number stored in the card is read and delivered to the operation unit 703, which searches a memory location corresponding to the personal number and delivers the personal information stored in the memory unit 702 to the engine control unit 709, transmission unit 710, air conditioning unit 711, power steering unit 712 and other unit 715. Stored in the memory unit are a plurality of pieces of personal information and initial values comprising standard set values for corresponding specifications. These pieces of information may be delivered to the respective units when the system is abnormal or when required. The personal information or initial values set in the respective units, for example, during automobile driving are changed by inputting new information to the operation unit. When the ignition key is off, this fact is stored in the memory unit as personal information except when the initial values are set in all the units.

Figure 19:
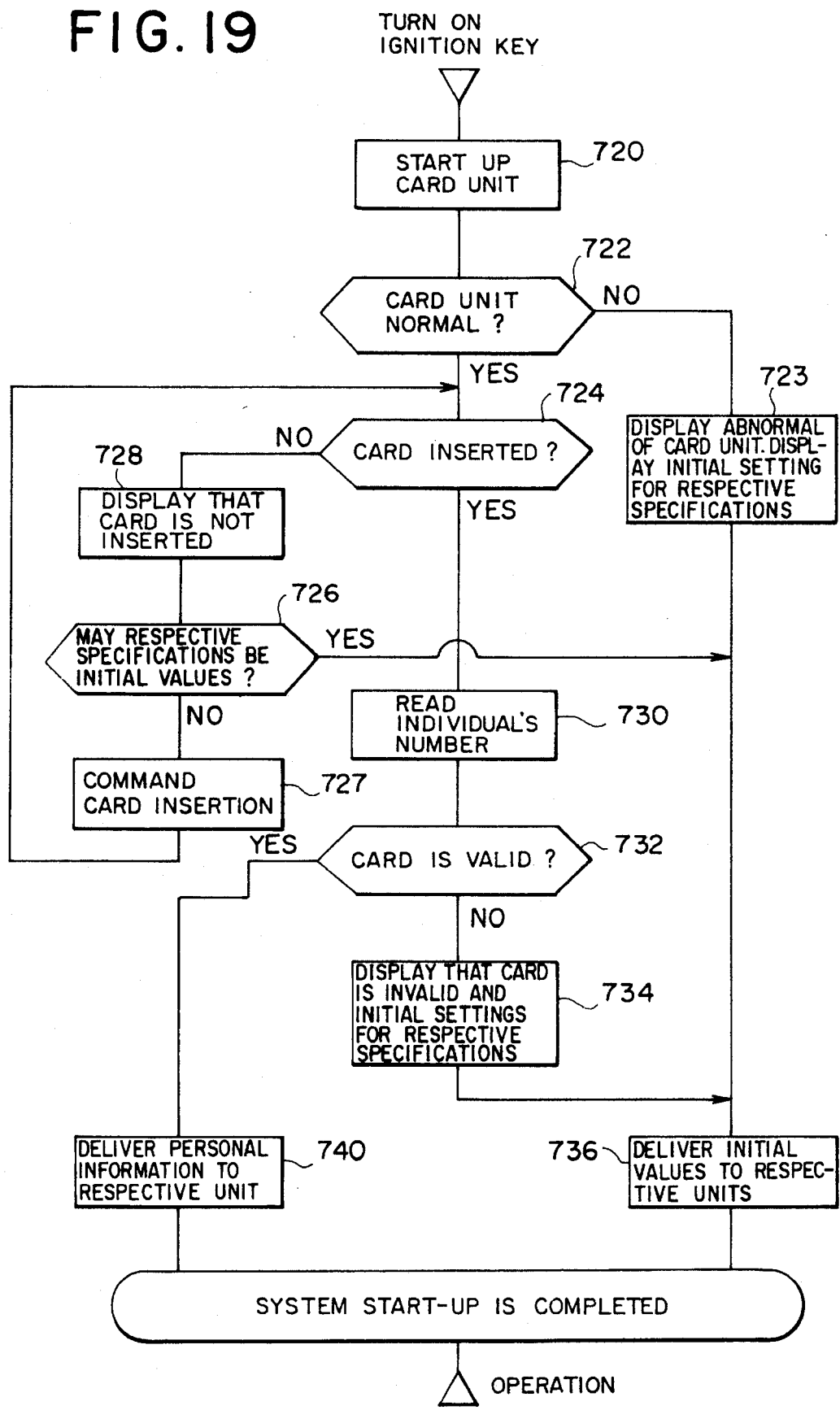
FIG. 19 is a flowchart indicative of the detection of possible abnormalities occurring at system start-up.

FIG. 19 illustrates the processing performed when an abnormality is detected at the start-up of the system. When the ignition key is on, the control of the card unit is started at step 720. At step 722 the card unit diagnoses itself, displays on the operation unit display that the card unit is abnormal when an abnormality is detected, lights a personal memory system alarm lamp in the meters 704 and also sounds an alarm. The operation unit display then displays that the respective specifications will be set initially at step 723.

If the card unit is normal, it is checked at step 724 whether the card is inserted. If not, it is checked at step 726 whether each specification may be an initial setting. The result is displayed at the card unit and operation unit displays at step 736. If the driver inputs to the card unit or operation unit data indicating that he will select initial setting or if he sets the ignition key at the START position, the specifications of each unit become an initial setting. When the driver inputs to the card unit or operation unit data indicating that he will select the personal information setting, a request for the insertion of the personal card is designated at step 727.

When the personal card is inserted, the personal number stored on the card is read at step 730 and it is checked at step 732 whether the personal number is read correctly. If not and if there is no personal information corresponding to the read personal number, an indication that the personal card is ineffective is provided on the card unit and operation unit displays and the alarm is sounded simultaneously at step 734. Thereafter, a display that each specification will be an initial setting is made on the operation unit display at step 736.

If the card is determined as being effective, personal information is delivered to the respective units at step 740.

The start-up of the system is completed when the personal information or initial values are delivered to the respective units.

When data on a change of the specification is input by the operation unit at the start-up of the system, it is determined whether the input value is within the specification limiting range. If not, this fact is displayed on the operation unit display and the alarm is sounded. In specification setting, the values present before changed values are input are held.

According to the present embodiment, when an abnormality is detected in the system, the respective specifications are set at standard values necessary for driving to thereby enable driving. By sounding the alarm, the driver is prompted to service an abnormal element. By inputting data through the operation unit, the setting of the respective specifications is changed so as to satisfy the driver's desire.

According to the present embodiment, when an abnormality is detected in the system, the respective specifications are set at standard values necessary for driving to thereby enable driving. By informing the driver of the occurrence of an abnormality by sounding the alarm, the driver is prompted to service the abnormal element.

What we claimed is:

1. An automobile control system, comprising:

control devices provided in an automobile for controlling operations of the automobile in accordance with data representing control characteristics of said operation;

first rewritable storage means for storing operator-specific configuration data representing a plurality of different control characteristics for said control devices, said different control characteristics being related to use by different drivers of said control devices in the operation of the automobile;

means for reading from said first storage means data representing a control characteristic corresponding to a particular driver who has input data to the system and for delivering the data to said control devices in response to data inputted by the particular driver to operate said control devices;

means for modifying data representing a designated control characteristic for a particular driver as stored in said first storage means in response to a command and data input by the particular driver to adapt the modified control characteristic to requirements of said particular driver for operation of the automobile;

determining means for determining whether the particular driver who has inputted data to operate said control devices matches the driver corresponding to the data representing a characteristic stored in said first storage means to control said reading means to read from said first storage means only when a match is detected;

second storage means for storing data representing predetermined control characteristics;

means for checking whether or not the data stored in said first storage means and a determination made by said determining means are within a predetermined normal range; and means for selecting one of the control characteristics of said first storage means and said second storage means for outputting selected control characteristic to said control devices by selecting data representing the control characteristic of said first storage means when said checking means determines that the data stored in said first storage means and the determination made by said determining means are within said predetermined normal range, and by selecting data representing the control characteristic of said second storage means when said checking means determines that the data stored in said first storage means and the determination made by said determining means are not within the predetermined normal range.

2. An automobile control system according to claim 1, wherein said control devices includes an automatic automobile transmission and wherein the data indicating the control characteristics stored in said first storage means and said second storage means includes data which designates a transmission shift point of said automatic transmission.

* * * * *